(12) United States Patent  (10) Patent No.: US 7,937,685 B2
Weil et al.  (45) Date of Patent: May 3, 2011

(54) COMPUTER SOFTWARE IMPLEMENTED FRAMEWORK FOR CONFIGURATION AND RELEASE MANAGEMENT OF GROUP SYSTEMS SOFTWARE, AND METHOD FOR SAME

(75) Inventors: Michael S. Weil, Tampa, FL (US); Steven N. Nau, Tampa, FL (US); Wayne P. Webb, Tampa, FL (US)

(73) Assignee: HSBC Technology & Services (USA) Inc., Mettawa, IL (US)

( * ) Notice: Subject to any disclaimer, the term of this patent is extended or adjusted under 35 U.S.C. 154(b) by 1422 days.

(21) Appl. No.: 11/330,065

(22) Filed: Jan. 12, 2006

(65) Prior Publication Data

US 2006/0155768 A1 Jul. 13, 2006

Related U.S. Application Data

(60) Provisional application No. 60/643,758, filed on Jan. 13, 2005.

(51) Int. Cl.
G06Q 40/00 (2006.01)
G06Q 20/00 (2006.01)
G06Q 99/00 (2006.01)
G06F 21/00 (2006.01)
G06F 9/44 (2006.01)
G06F 9/445 (2006.01)

(52) U.S. Cl. ........ 717/103; 717/100; 717/102; 717/107; 717/120; 717/122; 717/124; 717/168; 717/174; 705/35; 705/54; 705/80; 705/323

(58) Field of Classification Search .................. None
See application file for complete search history.

(56) References Cited

U.S. PATENT DOCUMENTS

| 5,204,960 | A | 4/1993 | Smith et al. |
|---|---|---|---|
| 5,428,788 | A | 6/1995 | Schwanke |
| 5,613,114 | A | 3/1997 | Anderson et al. |
| 5,675,802 | A | 10/1997 | Allen et al. |
| 5,692,158 | A | 11/1997 | Degeneff et al. |
| 5,835,896 | A | 11/1998 | Fisher et al. |
| 5,873,071 | A | 2/1999 | Ferstenberg et al. |
| 5,905,974 | A | 5/1999 | Fraser et al. |

(Continued)

FOREIGN PATENT DOCUMENTS

BR PI 9709338-6 A 8/1999

(Continued)

OTHER PUBLICATIONS

International Search Report and Written Opinion issued for International Patent Application No. PCT/US2006/000906.

(Continued)

*Primary Examiner* — Emerson C Puente
*Assistant Examiner* — Jonathan R Labud
(74) *Attorney, Agent, or Firm* — Stroock & Stroock & Lavan LLP

(57) ABSTRACT

A global framework multi-layer computer based architecture is provided. The global framework may include a single set of libraries that contains common source code applicable to substantially all business processing systems using the global framework. The global framework may include individual source code libraries that contain modifications specific to a business processing system to meet the local needs of that business processing system. The business processing systems may execute the custom and base libraries through concatenation of the libraries.

30 Claims, 18 Drawing Sheets

U.S. PATENT DOCUMENTS

| | | | |
|---|---|---|---|
| 5,905,975 | A | 5/1999 | Ausubel |
| 5,920,723 | A | 7/1999 | Peyton, Jr. et al. |
| 5,960,200 | A | 9/1999 | Eager et al. |
| 6,016,483 | A | 1/2000 | Rickard et al. |
| 6,021,398 | A | 2/2000 | Ausubel |
| 6,112,189 | A | 8/2000 | Rickard et al. |
| 6,178,549 | B1 | 1/2001 | Lin et al. |
| 6,243,691 | B1 | 6/2001 | Fisher et al. |
| 6,279,100 | B1 | 8/2001 | Tremblay et al. |
| 6,377,940 | B2 | 4/2002 | Tilfors et al. |
| 6,405,364 | B1 | 6/2002 | Bowman-Amuah |
| 6,473,794 | B1 * | 10/2002 | Guheen et al. ............... 709/223 |
| 6,553,563 | B2 | 4/2003 | Ambrose et al. |
| 6,601,233 | B1 | 7/2003 | Underwood |
| 6,618,707 | B1 | 9/2003 | Gary |
| 6,662,357 | B1 | 12/2003 | Bowman-Amuah |
| 6,671,867 | B2 | 12/2003 | Alpert et al. |
| 6,757,689 | B2 | 6/2004 | Battas et al. |
| 6,779,028 | B1 | 8/2004 | Nakamura |
| 2001/0044767 | A1 | 11/2001 | Madoff et al. |
| 2002/0035534 | A1 | 3/2002 | Buist et al. |
| 2002/0049603 | A1 | 4/2002 | Mehra et al. |
| 2002/0087456 | A1 | 7/2002 | Abeshouse et al. |
| 2002/0091606 | A1 | 7/2002 | Shapiro |
| 2002/0095369 | A1 | 7/2002 | Kaplan et al. |
| 2002/0107684 | A1 | 8/2002 | Gao |
| 2002/0124245 | A1 | 9/2002 | Maddux et al. |
| 2002/0129356 | A1 | 9/2002 | Hellerstein et al. |
| 2002/0156716 | A1 | 10/2002 | Adatia |
| 2002/0157076 | A1 | 10/2002 | Asakawa |
| 2002/0161687 | A1 | 10/2002 | Serkin et al. |
| 2002/0194105 | A1 | 12/2002 | Klein |
| 2002/0198734 | A1 | 12/2002 | Greene et al. |
| 2003/0004858 | A1 | 1/2003 | Schmitz et al. |
| 2003/0014354 | A1 | 1/2003 | Madoff et al. |
| 2003/0037315 | A1 | 2/2003 | Adams et al. |
| 2003/0061148 | A1 | 3/2003 | Alavian |
| 2003/0088501 | A1 | 5/2003 | Gilbert et al. |
| 2003/0120593 | A1 | 6/2003 | Bansal et al. |
| 2003/0167356 | A1 * | 9/2003 | Smith et al. ............... 709/328 |
| 2003/0177082 | A1 | 9/2003 | Buckwalter |
| 2003/0177085 | A1 | 9/2003 | Buckwalter et al. |
| 2003/0182652 | A1 | 9/2003 | Custodio |
| 2004/0006537 | A1 | 1/2004 | Zelechoski et al. |
| 2004/0015833 | A1 | 1/2004 | Dellarocas et al. |
| 2004/0024689 | A1 | 2/2004 | Zhou et al. |
| 2004/0030630 | A1 | 2/2004 | Tilfors et al. |
| 2004/0031015 | A1 | 2/2004 | Ben-Romdhane et al. |
| 2004/0046785 | A1 | 3/2004 | Keller |
| 2004/0054984 | A1 | 3/2004 | Chong et al. |
| 2004/0098703 | A1 | 5/2004 | Kondur |
| 2004/0098713 | A1 | 5/2004 | Ogawa et al. |
| 2004/0133445 | A1 | 7/2004 | Rajan et al. |
| 2004/0158488 | A1 | 8/2004 | Johnson |
| 2006/0155768 | A1 * | 7/2006 | Weil et al. ............... 707/104.1 |

FOREIGN PATENT DOCUMENTS

| | | |
|---|---|---|
| BR | PI 0111112-4 A | 4/2003 |
| BR | PI 0207926-7 A | 4/2004 |
| CA | 2403775 | 9/2001 |
| CN | 1357830 | 7/2002 |
| CN | 1368693 | 9/2002 |
| CN | 1135472 C | 1/2004 |
| CN | 1164990 C | 9/2004 |
| EA | 3418 | 4/2003 |
| EP | 0012138 | 6/1980 |
| EP | 0191999 | 8/1986 |
| EP | 0 273 703 | 7/1988 |
| EP | 0285311 | 10/1988 |
| EP | 0395555 | 10/1990 |
| EP | 0421808 | 4/1991 |
| EP | 0531084 | 3/1993 |
| EP | 0546894 | 6/1993 |
| EP | 0564985 | 10/1993 |
| EP | 0623884 | 11/1994 |
| EP | 0624842 | 11/1994 |
| EP | 0661647 | 7/1995 |
| EP | 1014264 | 6/2000 |
| EP | 1022670 | 7/2000 |
| EP | 1024446 | 8/2000 |
| EP | 1032215 | 8/2000 |
| EP | 1032216 | 8/2000 |
| EP | 1098263 | 5/2001 |
| EP | 1113376 | 7/2001 |
| EP | 1138784 | 10/2001 |
| EP | 1176529 | 1/2002 |
| EP | 1178416 | 2/2002 |
| EP | 1202202 | 5/2002 |
| EP | 1223524 | 7/2002 |
| EP | 1241601 | 9/2002 |
| EP | 1274028 | 1/2003 |
| EP | 1276063 | 1/2003 |
| EP | 1298570 | 4/2003 |
| EP | 1338990 | 8/2003 |
| EP | 1357472 | 10/2003 |
| EP | 1378831 | 1/2004 |
| EP | 1394705 | 3/2004 |
| EP | 1418501 | 5/2004 |
| EP | 1422669 | 5/2004 |
| EP | 1445702 | 8/2004 |
| GB | 2251098 | 6/1992 |
| GB | 2337139 | 11/1999 |
| GB | 2338814 | 12/1999 |
| GB | 2351366 | 12/2000 |
| GB | 2 360 866 | 10/2001 |
| GB | 2368177 | 4/2002 |
| GB | 2370904 | 7/2002 |
| GB | 2377071 | 12/2002 |
| GB | 2378552 | 2/2003 |
| GB | 2386722 | 9/2003 |
| GB | 2387259 | 10/2003 |
| GB | 2389441 | 12/2003 |
| WO | WO-92/12479 | 7/1992 |
| WO | WO-97/43893 | 11/1997 |
| WO | WO-00/33183 | 6/2000 |
| WO | WO-01/13229 | 2/2001 |
| WO | WO 01/27755 | 4/2001 |
| WO | WO-01/90850 | 11/2001 |
| WO | WO-01/95102 | 12/2001 |
| WO | WO-02/079922 | 10/2002 |
| WO | WO-03/077068 | 9/2003 |
| WO | WO-03/098490 | 11/2003 |
| WO | WO-2004/042575 | 5/2004 |

OTHER PUBLICATIONS

International Preliminary Report on Patentability Under Chapter I issued for International Patent Application No. PCT/US2006/000906.

Tichy, W.F. "RCS—A System for Version Control," Software—Practice and Experience, vol. 15(7), 637-654, Jul. 1985.

Supplementary European Search Report issued for corresponding European Patent Application No. EP 06718029.

* cited by examiner

COMPUTER SOFTWARE IMPLEMENTED FRAMEWORK FOR CONFIGURATION AND RELEASE MANAGEMENT OF GROUP SYSTEMS SOFTWARE, AND METHOD FOR SAME

CROSS REFERENCE TO RELATED PATENT APPLICATION

This application claims the benefit under 35 U.S.C. §119(e) of U.S. Provisional Patent Application No. 60/643,758, filed Jan. 13, 2005, which is hereby incorporated by reference herein in its entirety.

FIELD OF THE INVENTION

The present invention generally relates to a framework for configuration and release management of group systems software. More particularly, the present invention relates to a framework for configuration and release management of group application systems software in an application-based software system such as, for example, an account management system, financial system, or banking system. The framework of the present invention provides for configuration and release management of group application systems software both globally to the software system and locally to business units within the software system.

BACKGROUND OF THE INVENTION

The configuration and release management of group systems software, and in particular group application systems software in an account management system of a large banking entity, can involve software changes and deployment at both the global level and at the local level. For example, a global bank such as HSBC conducts business in 76 countries and territories around the world. These operations are managed in four geographical regions: the Americas; Europe; the Middle East and Africa; and Asia Pacific. Each of these regions encompasses multiple countries, and each country includes several strategic business units, or SBUs, which are HSBC's smallest business operating divisions. In order to address the needs of SBUs around the world, HSBC deploys mainframe-based "group systems" software applications. These software applications may be developed in-house, or may be based around commercially-available software packages which are supported by a vendor and enhanced by HSBC as necessary.

A difficulty in employing an account management system of the complexity and scope of the HSBC system is the amount of overhead that accompanies deployment of a complete copy of the system for each of the SBUs using the system. A complete copy of the software system may include, for example, source code, copybooks, and job control language for each of the software application components within the software system. In the majority of cases, much of the group application systems software is common for all SBUs, with only a relatively small amount of customization necessary for an application to effectively support an individual SBU.

Various approaches have been employed in the past in connection with software configuration and release management. An example of a computing system deployment planning method is disclosed in Tseng et al. International Patent Publication No. WO 03/098490, published Nov. 27, 2003, shown in FIG. 1, and incorporated herein by reference. The computing system deployment planning method of FIG. 1 is implemented using deployment planning system 10, which resides on a computer-based system that is networked for access to a component profile server 12. User 14 interacts with deployment planning system 10 through a graphical user interface 16. Deployment planning system 10 includes a plurality of component profiles stored in a component profile repository. Deployment planning system 10 allows for the deployment of services or a computing system with just the component profiles of the required components. The component profiles are used for deployment testing prior to implementation of the actual system components.

An example of a method for service and role-based software distribution is disclosed in Hellerstein et al. United States Patent Publication No. US 2002/0129356, published Sep. 12, 2002, shown in FIG. 2, and incorporated herein by reference. The method starts at step 20. At step 21, a new software package is introduced. The software package and its description are entered in a service distribution server and stored in a global software repository. At step 22, target regions for distribution of the software package are selected. This step is performed by the software distribution server to determine all the region servers whose service profiles match the service that is going to be provided by the new package. At step 23, the software is distributed from the software distribution server to a region server. For each region in the target set (computed in step 22), the software distribution server prepares a package that is suitable for target machines in that region. This package is then transported to the region. At step 24, the region server determines if each of the potential targets has the appropriate resources (e.g., CPU, RAM, disk space, swap space, etc.). At step 25, the region server retrieves the target roles. At step 26, the software is distributed from the region server to the target machines. At step 27, the results of the software distribution are gathered, and tests are done on the installed software. Installation results are gathered at the region server. At step 28, the region server sends the status of the distribution step to the software distribution server, and the method ends.

An example of a system and method for application management is disclosed in Nakamura U.S. Pat. No. 6,779,028, issued Aug. 17, 2004, shown in FIG. 3, and incorporated herein by reference. Application operation definition storage files are removed from application server computers 30, 32, and 34 and are instead provided on management server computer 36. Management server computer 36 includes application operation definition storage file 38 to systematically manage application computers 30, 32, and 34 via network 40. When an execution request for an application is generated on application server computer 30, application management section 42 looks up the operation definition data of the requested application from application operation definition storage file 38. Application management section 42 executes a to-be-managed application 44. Application management section 42 stores the state of executed application 44 in application current state update file 46. When application management section 42 receives an interrupt message indicating an end event of the executed application, application current state update file 46 is used to store the application execution history. The application execution request is then transmitted to all application server computers in server computer group 48 via network 40. Upon receiving the execution request, application management section 42 looks up the operation definition of the requested application in application operation definition storage file 38. Except when the operation definition of the application indicates that the application operates in the requesting computer, application management section 42 discards the execution request in application server computer 30. The application execution request is then processed using an application management section in another application server computer (e.g., application server computer 32 or 34) by accessing application operation definition storage file 38.

An example of a system and method for software building and deployment is disclosed in Custodio United States Patent Publication No. US 2003/0182652, published Sep. 25, 2003, shown in FIG. 4, and incorporated herein by reference. Software building and deployment system 62 manages the deployment of software and content to a development environment 64, a testing environment 66, and a production environment 68. In the context of providing a commercial web site, production environment 68 contains all of the code and content that hosts the web site for the public. A component is promoted from one environment 60 to another when that component meets the required quality assurance test criteria assigned to each particular environment 60. One or more servers 70 host each environment 60. Software building and deployment system 62 handles all aspects of the deployment of software and content to environments 60. System 62 interfaces directly with one or more source code repository systems 72. System 62 also interfaces with external builders 74, which handle the compilation of source code. Finally, system 62 interfaces with content deployment and replication engines 76 which handle the actual movement of source code and content to environments 60. System 62 controls interactions between source code repositories 72, external builders 74, and content deployment and replication engines 76 so as to manage all changes to one or more computing environments 60. In this way, every change to an environment 60 is handled and tracked by system 62 as a separate release. System 62 is instructed to create a new release in an environment 60 through a manifest 78. Manifest 78 includes the instructions necessary for system 62 to select the correct source material from repositories 72, compile the material, if necessary, using builder 74, and deploy the compiled versions to the appropriate environment 60 using a deployment and replication engine 76. All changes to an environment 60 are initiated by a manifest 78, and therefore each manifest 78 is considered to define a new release for the environment 60 specified by the manifest 78.

An example of a method and apparatus for software deployment is disclosed in Zelechoski et al. United States Patent Publication No. US 2004/0006537, published Jan. 8, 2004, shown in FIG. 5, and incorporated herein by reference. The system architecture includes a total of five layers: business applications layer 90, application bus layer 92, application services layer 94, technology bus layer 96, and technology platform layer 98. Business applications layer 90 includes common application services that provide needed common application functionality to the business applications. Application bus layer 92 provides the necessary communication protocols and configuration information to allow any application to invoke any needed service, regardless of the physical location of that requested service. For example, there may be requests from business application layer 90 to services within application services layer 94. Application services layer 94 includes a number of modularized service engines and common application services, which may be invoked from business application layer 90 or from within the application services layer. Technology bus layer 96 provides access to technology platform layer 98. This layer insulates the business applications and application engines from the physical hardware, the network, and the physical data storage mechanisms. Technology platform layer 98 includes a number of different technology platforms.

As described hereinabove, a number of past approaches exist in connection with software configuration and release management. It would be desirable to improve upon these past approaches and provide a framework for configuration and release management of group application systems software in a software system, providing for configuration and release management both globally to the software system and locally to business units within the software system.

SUMMARY OF THE INVENTION

In accordance with at least one embodiment of the present invention, a framework for configuration and release management of group application systems software is provided. In particular, the framework of the present invention may provide for the configuration and release management of group application systems software in an application-based software system such as an account management system, both globally to the account management system and locally to business units within the account management system. (It should be noted that the framework of the present invention is described herein primarily in the context of an account management application-based software system, and in particular a credit card account management system. However, this is merely illustrative, and one of skill in the art will realize that the framework of the present invention may be applied to any suitable application-based software system that requires the configuration and release management of group systems software.)

The complex nature of an account management system having numerous group systems requires a comprehensive set of policies, procedures, naming standards, and tools to permit management of both the similar and distinct needs of strategic business units (SBUs) using the system. For example, for a global bank such as HSBC, numerous group systems may be used within a credit card account management system. HSBC, for example, designates about 18 application systems within the credit card account management system as group systems. These group systems may be in use in more than one of a group's SBUs.

The framework of the present invention has been built and enhanced on the premise that common functions can be provided through a single set of "base" source code, while allowing country- or SBU-specific processing through modifications, control parameters, and the integration of locally-developed solutions. The present invention provides a global framework to manage the source and execution components that provide and support the production environments to support business software applications. (The framework of the present invention may be referred to interchangeably herein as both a "framework" and a "global framework.")

The global framework of the present invention is both a structure and a set of associated tools and processes that allow a single base of program code and related components to be managed and modified, thereby meeting the processing needs of business units within the account management system. The global framework provides flexibility to incorporate software changes as business needs evolve, while keeping code release versions consistent and current across all business units within the account management system. This flexibility results in an improved speed-to-market for changes to the account management system. The elements of the global framework, in at least one embodiment, include:

- a single set of libraries that contain all common card system elements (the "global version" of the system);
- policies, processes, and procedures that enable consistent use of and modifications to common card system elements;
- regional load module libraries to manage installation and distribution of revised card system elements at a specific site or for a set of time zones;
- individual code libraries for SBUs that contain business unit specific modifications to meet local needs (e.g., local modifications that supplement or replace global business processing);
- individual execution environments (e.g., online and batch) to support data management and processing for each SBU; and
- naming standards that are defined to control and identify components, libraries, data sets, and execution environments.

One or more of the above elements may be utilized in alternative embodiments of the global framework of the present invention.

The global framework of the present invention includes various features and components for configuration and release management of group systems software. The global framework includes source, copybook, load module, and related libraries used to contain components of the card system. Such components may include, for example, JCL, PROCs, control cards, etc. The global framework includes naming conventions to ensure segregation and control of both global and SBU-specific components, libraries, and datasets for development, testing, and production. The global framework includes a comprehensive change management structure that controls the use of software version promotion levels. The framework supports the concurrent development of components within the framework. In one example, the component change management tool used in conjunction with the framework is ChangeMan®, sold by SERENA Software, Inc. of San Mateo, Calif.

The global framework of the present invention and its associated tools, processes, and procedures effectively deliver group application systems software within an account management system. The global framework provides standardized tools and techniques for concurrent development of software for multiple SBUs from a single source platform. In doing so, the global framework significantly reduces the number of system components for which changes need to be managed for users of a particular group system. For example, a complete deployment of group application systems software supporting a credit card account management system may include about 21,000 components of source code and copybooks. Of these 21,000 components, only about 2,500 (or about 12%) may be specific to a large SBU, with smaller SBUs having significantly less customization.

The framework of the present invention may be used in connection with any entity (e.g., vendor, governmental agency, in-house developer, etc.) that provides updates or changes to the credit card account management system. Possible software updates may include, for example, compliance updates, enhancement releases, and fixes.

Compliance updates address any changes to operating regulations by a credit card provider (e.g., Visa, MasterCard). These operating regulations change on a regular basis to meet the needs of all credit card issuing and acquiring members. As a result, payment card association members, banks, and processors must comply with these amendments on a set schedule. These mandates are usually effective on the first of April and the first of October of each year. A software vendor or in-house developer develops compliance updates for all components within a credit card account management system. These compliance updates are delivered by the vendor or in-house developers typically in mid-February and mid-August. The bank then accepts these updates for integration into the bank's specific version of the credit card account management system.

Enhancement releases address any new features and functionality that are added to the credit card account management system. These releases may be created by a vendor, or may be created in-house. (Various updates, enhancements, and fixes may be described herein as "vendor" or "in-house." It should be noted that the framework of the present invention may be used in conjunction with any changes to the software, whether developed by a vendor or an in-house developer. The description of vendor or in-house developed code is for illustration only.) Typically, vendor enhancements are delivered every twelve to eighteen months, and are packaged as a new release of the business system. The vendor's enhancement releases are integrated with a bank's version of the credit card account management system for delivery in an internal enhancement release.

Fixes may be released by a vendor or by in-house developers to correct any specific software problems or to update system processing based upon the business needs of the bank or a specific SBU.

For efficient release management of group application systems software within the account management system, the framework of the present invention controls the libraries and environments used in production and release testing. The framework supports the current version of the card system in production, and one or more additional versions to support the development and testing of a new software release to be implemented at the SBU level. Once the software release is certified as "production ready" it may be implemented by one or more SBUs as the result of a conversion. At any one time up to, for example, three (3) versions of the group application systems software may be used in production operation.

The framework of the present invention includes multiple layers to segregate globally-applicable software from software that applies only to specific SBUs. The layers of the framework permit the use of a single base of global source code and components to be used as a foundation for all card system users, while supporting the specific needs of each SBU. In at least one embodiment of the present invention, the framework may include six layers: global, base, regional, custom, environment, and local. However, these layers are merely illustrative, and the framework may include some, all, or additional layers to the six layers recited above and described hereinbelow.

The global layer of the framework provides a development environment for credit card system developers. The global layer acts as the initial point at which vendor source code and/or copybook enhancements are integrated with the custom enhancements developed by in-house developers on behalf of all SBUs. The global layer supports the process of merging two compatible sets of source code and copybook libraries into a full set of merged programs (e.g., source code and copybooks) that forms the foundation of the global credit card system, so that these programs can be compiled and preliminarily tested, prior to staging of the applications into the base layer. Upon successful testing and baseline of compliance updates, enhancement releases, and fixes at the global layer of the framework, changed components are staged to the appropriate libraries at the base layer for integration, testing, and subsequent installation in the production environment. Changes that are specific to only certain SBUs, and not to the entire card system, may follow a similar staging process at the custom layer of the framework.

The base layer provides support for the development and installation of sub-systems within the card system. Vendor and homegrown solutions are integrated into the global credit card system at the base layer. In addition, in-house developers may apply further fixes and modifications to the credit card system, as appropriate, at the base layer. This process requires the merging of homegrown changes with vendor-supplied source code and copybooks to create the merged base set of libraries for source code and copybooks. When warranted and upon completion of integration and testing of these changes in the appropriate base layer environments, card system global load modules are baselined and installed at the regional layer. In addition, all related and required components for the abovementioned card system global load modules are also baselined and installed.

The regional layer provides a point at which SBU production load libraries are distributed to support execution in batch or online. The regional layer contains the execution libraries for base layer load modules, so that individual SBUs can easily access the appropriate components in a local operational environment. This is accomplished through concatenations of load module libraries. The regional layer load module libraries eliminate reliance on a single physical set of base layer libraries for load modules. In some embodiments, developers are prevented from changing the contents of these load libraries, except through the authorized promotion/installation processes defined within the change management software at the base layer.

The custom layer provides the ability to maintain the integrity of the global card system through code management tools and infrastructure. The custom layer provides enhanced ability to minimize time to market for minor releases and fixes to the card system, and more particularly to the software applications utilized by specific SBUs. The custom layer also provides support for the evolution of solutions that have been proven and tested at the SBU level to be deployed globally as a part of a major release. The custom layer provides the ability for each SBU to identify and implement processing rules and data that are specific to local market needs. New or modified components that exist in the custom layer are accessed during execution at the environment layer by use of concatenations of the load module libraries within JCL that point to the custom layer libraries first. If any given component is not found at the custom layer, then the regional layer load module libraries will be used.

The environment layer is the operational processing environment in which all card system applications execute and where data files and databases are controlled and updated. The environment layer includes batch and online processing environments that support testing and production requirements. The environment layer includes a complete set of databases, files, and execution environments for each SBU. A distinct environment (e.g., batch and online) is created for each testing level required to support the SBU, as well as for production. The data files and databases are updated only by card system applications.

The local layer is a complete environment created for each SBU that contains non-card system application load modules that are used by an SBU and are dependent on card system data and may use data from other sources. These non-card system applications receive interface data from the environment layer during or after execution of card system applications. The definition, development, and maintenance of these local applications may be managed and controlled, for example, by staff at the SBU.

In some embodiments of the present invention, a global framework computer based architecture may be provided. The architecture may include a source code management system that provides executable development and testing environments to support component applications in production. The architecture may include at least one set of associated tools and processes, in operative interaction with the source code management system, providing a single base of program code for the component applications to be managed and modified by the source code management system using the executable production environments for multiple business processing systems using the global framework computer based architecture. The architecture may provide functionality and may be adapted to manage modifications of the multiple business processing systems, while simultaneously maintaining software source code release versions consistent and current across the multiple business processing systems. The architecture may, for example, reduce the number of source code management system components for which changes need to be managed for the multiple business processing systems.

In one example, the architecture may further include a single set of libraries that contain substantially all common source code management system elements applicable to the multiple business processing systems. In another example, the architecture may further include individual code libraries for the multiple business processing systems that contain modifications specific to a business processing system to meet local needs of the business processing system and providing the multiple business processing systems the functionality of concatenation.

In yet another example, the architecture may further include individual online and/or batch execution environments to support data management and processing for each of the business processing systems. In still another example, the architecture may further include at least one set of associated tools and processes, in operative interaction with the source code management system, to enable consistent use of and modification to source code management system elements common to the multiple business processing systems. In yet another example, the architecture may further include at least one regional load module library, in operative interaction with the source code management system, providing for installation of revised source code management system components for a specific business processing system or for multiple business processing systems within a particular time zone. In yet another example, the architecture may further include a plurality of naming standards to control and identify components, libraries, data sets, and/or execution environments within the source code management system.

In some embodiments of the present invention, a global framework multi-layer computer based architecture including at least one source code management system that provides executable production environments to support component applications may be provided. The multi-layer architecture may include a base layer providing development and installation functionality for multiple business processing systems within the source code management system. Source code for the multiple business processing systems may be staged to the base layer for integration with existing source code for the multiple business processing systems to create a merged base set of libraries. The merged base set of libraries may contain substantially all common source code management system elements applicable to the multiple business processing systems. The merged base set of libraries may be tested in the base layer prior to implementation of the merged base set of libraries.

The multi-layer architecture may include a custom layer, in operative interaction with the base layer, providing development and installation functionality for a business processing system of the plurality of business processing systems within the source code management system. Source code for the business processing system may be staged to the custom layer for integration with existing source code for the business processing system to create a merged custom set of libraries. The merged custom set of libraries contains substantially all modifications specific to the business processing system to meet local needs of the business processing system, and the merged custom set of libraries used to create the load libraries in the custom layer used in the concatenation. The merged custom set of libraries may be tested in the custom layer prior to installation of the merged custom set of libraries. The custom layer may, for example, reduce time to market for modifications specific to each business processing system of the multiple business processing systems.

In one example, the multi-layer architecture may further include a global layer, in operative interaction with the base layer, providing development functionality for the multiple business processing systems within the source code management system. Source code for the multiple business processing systems may be developed within the global layer. The source code developed within the global layer may include, for example, source code from a plurality of separate entities. The source code from the plurality of separate entities may be merged for testing in the global layer prior to staging to the base layer.

In another example, the multi-layer architecture may further include a regional layer, in operative interaction with the base and custom layers, providing installation functionality for the merged base set of libraries. The installed base set of libraries may support execution by the multiple business processing systems in batch and/or online by allowing the multiple business processing systems to implement the base set of libraries, if necessary, by concatenating the custom set of libraries and the copy of the base set of libraries maintained at the regional layer. The base set of libraries in the regional layer may be protected, for example, such that contents of the base set of libraries cannot be changed at the regional layer.

In yet another example, the multi-layer architecture may further include an environment layer, in operative interaction with the custom layer, providing processing functionality for a business processing system of the plurality of business processing systems. The installed base set of libraries support execution by the multiple business processing systems in batch and/or online by allowing the multiple business processing systems to implement the base set of libraries, if necessary, by concatenating the custom set of libraries and the base set of libraries. The environment layer may include, for example, a complete set of databases and data files for each business processing system of the multiple business processing systems.

In still another example, the multi-layer architecture may include a local layer, in operative interaction with the custom layer, providing application load modules for each business processing system of the multiple business processing systems. The local layer load modules may be dependent upon source code management system data.

In some embodiments of the present invention, a global framework multi-layer computer based architecture including at least one source code management system that provides executable production environments to support component applications may be provided. The multi-layer framework may include a global layer providing development functionality for multiple business processing systems within the source code management system. Source code for the multiple business processing systems may be developed within the global layer. The multi-layer framework may include a base layer, in operative interaction with the global layer, providing development and installation functionality for the multiple business processing systems. The source code for the multiple business processing systems may be staged to the base layer from the global layer for integration with existing source code for the multiple business processing systems to create a merged base set of libraries. The merged base set of libraries may contain substantially all common source code management system elements applicable to the multiple business processing systems. The merged base set of libraries may be tested in the base layer prior to installation of the merged base set of libraries.

The multi-layer framework may include a regional layer, in operative interaction with the base layer, providing installation functionality for the merged base set of libraries. The installed base set of libraries may support execution by the multiple business processing systems in batch and/or online. The regional layer of the multi-layer framework may include source code components and load module components as a copy of the base layer installed load module components.

The multi-layer framework may include a custom layer, in operative interaction with the regional layer, providing development and installation functionality for a business processing system of the plurality of business processing systems, wherein source code for the business processing system is staged to the custom layer for integration with existing source code for the business processing system to create a merged custom set of libraries. The merged custom set of libraries may contain substantially all modifications specific to the business processing system to meet local needs of the business processing system and providing the business processing system the functionality of concatenation. The merged custom set of libraries may be tested in the custom layer prior to installation of the merged custom set of libraries.

The multi-layer framework may include an environment layer, in operative interaction with the custom layer, providing processing functionality for the business processing system of the plurality of business processing systems. The installed base set of libraries may support execution by the multiple business processing systems in batch and/or online by allowing the multiple business processing systems to implement the base set of libraries, if necessary, by concatenating the custom set of libraries and the regional copy of the base set of libraries.

The multi-layer framework may include a local layer, in operative interaction with the environment layer, providing application load modules for each business processing system of the multiple business processing systems. The local layer load modules may be dependent upon source code management system data.

In some embodiments of the present invention, a source code management system may be provided. The source code management system may include a first multi-layer framework for managing and maintaining an existing production environment for multiple business processing systems. The first multi-layer framework may include a global layer, base layer and a custom layer in operative interaction with the base layer. The base layer may provide a base set of libraries including source code management system elements common to the multiple business processing systems. The custom layer may provide a custom set of libraries including source code specific to a portion of the business processing systems. In one example, the first multi-layer framework may further include a complete set of change management software mnemonics, source libraries, copybook libraries, and/or load module libraries to support the base and custom layers of the second multi-layer framework.

The source code management system may include a second and subsequent multi-layer frameworks, in operative interactive with the first multi-layer framework. The second multi-layer framework may provide functionality for development and testing of a source code enhancement release within the source code management system. The second multi-layer framework may include a global layer, base layer and a custom layer in operative interaction with the base layer. The base layer may accept the enhancement release. The custom layer may integrate release modifications and test the enhancement release. The custom layer may receive contents of the custom layer of the first multi-layer framework. In one example, the second multi-layer framework may further include a complete set of change management software mnemonics, source libraries, copybook libraries, and/or load module libraries to support the base and custom layers of the second multi-layer framework.

The enhancement release may be tested within the second multi-layer framework prior to implementation within the first multi-layer framework. The second multi-layer framework may revert to a testing environment upon certification and installation of the enhancement release.

In one example, the first and second multi-layer frameworks provide the ability to rollback changes to a previous version of the source code management system if there are any problems with the enhancement release.

In another example, the first and second multi-layer frameworks may be independent of each other and can exist at the same time. In other words, the second multi-layer framework may integrate code from the first multi-layer framework and then exist and function independently of the first multi-layer framework. This allows an SBU to be subject to a conversion from the first multi-layer framework to the second multi-layer framework without any rollback.

In some embodiments of the present invention, a method for configuration and release management of group application systems software within a source code management system may be provided. One or more changed components of group application systems software may be received at a global layer of the source code management system. The one or more changed components of the group application systems software may be integrated into a single set of merged programs at the global layer. The single set of merged programs may be tested at the global layer. The one or more changed components may be merged into a base set of libraries for source code and copybooks at a base layer of the source code management system. The one or more changed components may be tested at the base layer. The load modules for the merged components may be installed at a regional layer using base load modules. In one example, the multiple business processing systems may be provided with the ability to implement the base set of libraries in batch and/or online by allowing the multiple business processing systems to concatenate a custom set of libraries at a custom layer and the base set of libraries.

In some embodiments of the present invention, a method for configuration and release management of group application systems software within a source code management system may be provided. One or more changed components of group application systems software may be received at a custom layer of the source code management system. The one or more components may be applicable to only a portion of multiple business processing systems within the source code management system. The one or more changed components may be merged at the custom layer with a base set of libraries for source code and copybooks to create a custom set of libraries. The custom set of libraries may be tested at the custom layer. The custom set of libraries may be installed at the custom layer using custom load modules. In one example, the multiple business processing systems may be provided with the ability to implement the custom set of libraries in batch and/or online by allowing the multiple business processing systems to concatenate the custom set of libraries and a base set of libraries at a regional layer.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

Additional embodiments of the invention, its nature and various advantages, will be more apparent upon consideration of the following detailed description, taken in conjunction with the accompanying drawings, in which like reference characters refer to like parts throughout, and in which.

DETAILED DESCRIPTION OF THE INVENTION

Figure 1:
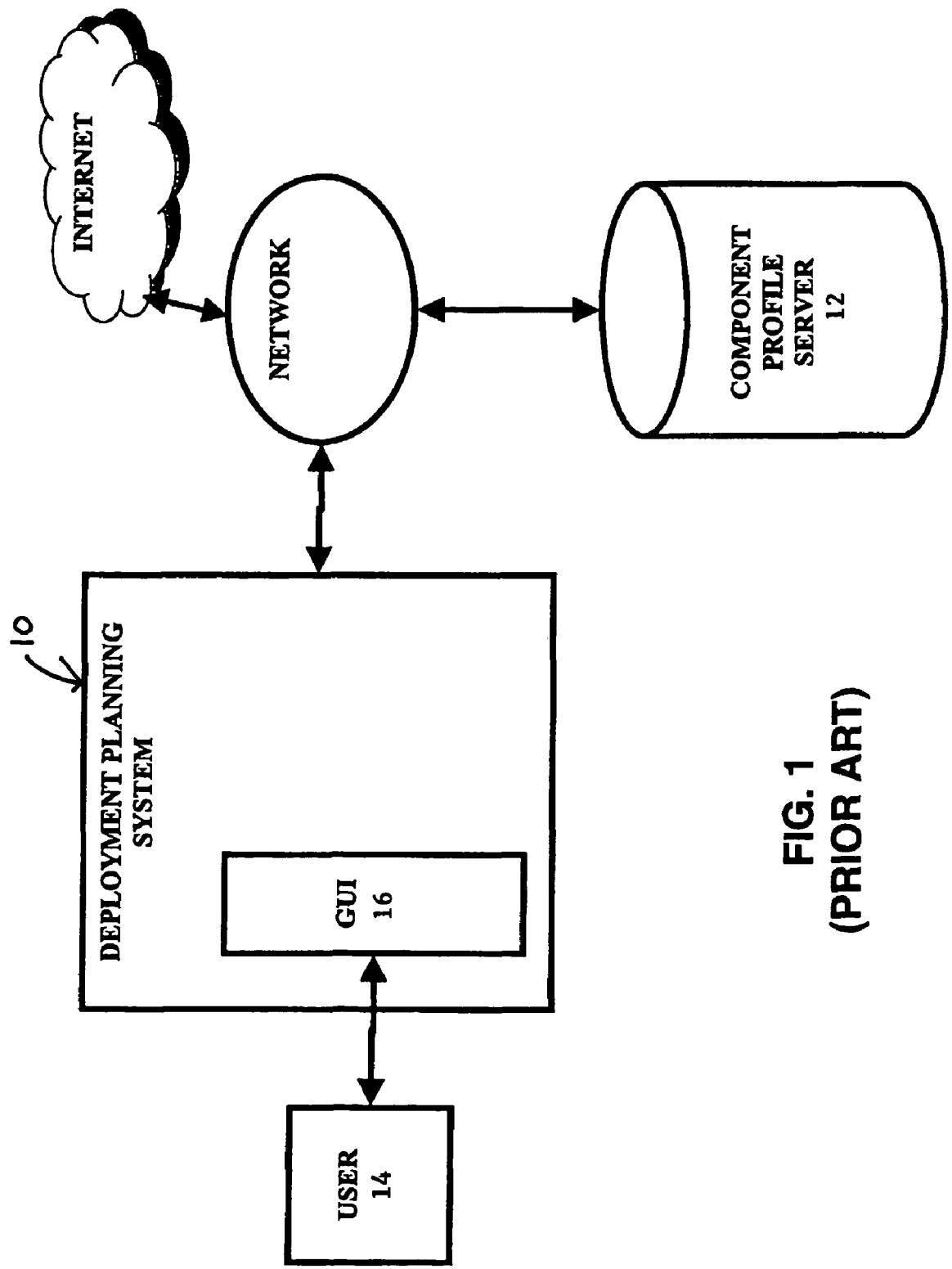
FIG. 1 illustrates a prior art computing system deployment planning method.
Figure 2:
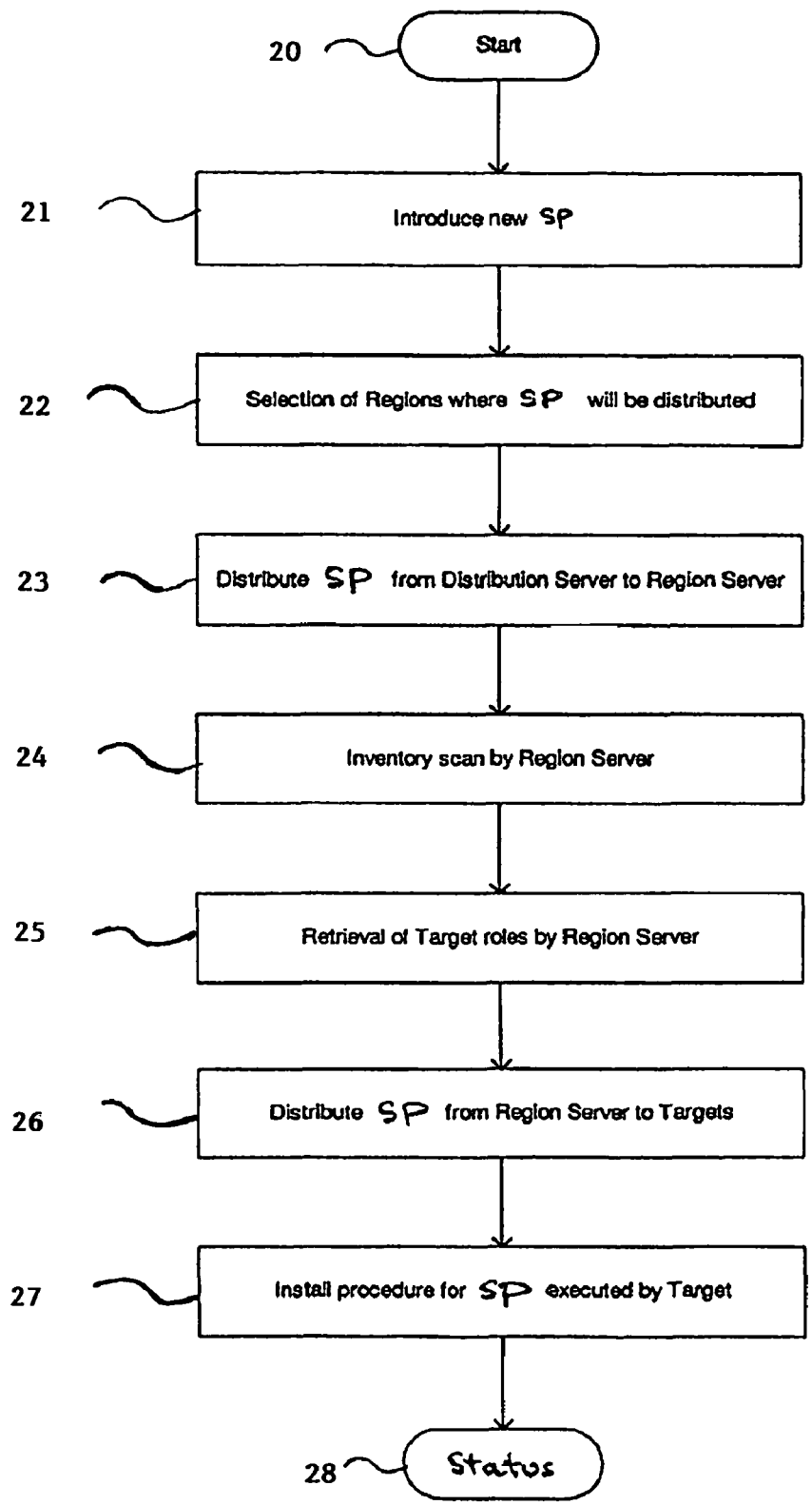
FIG. 2 illustrates a prior art method for service and role-based software distribution.
Figure 3:
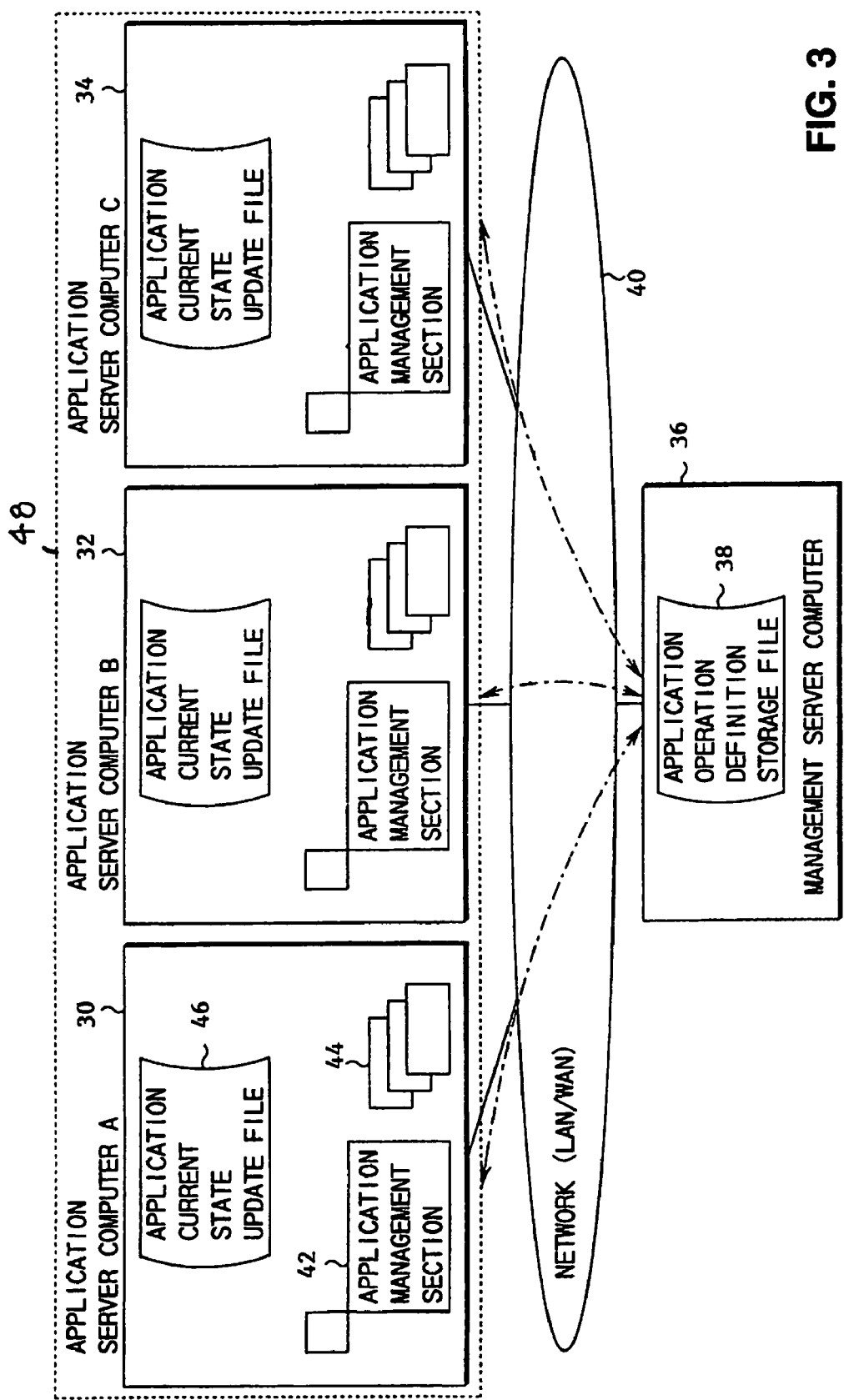
FIG. 3 illustrates a prior art system and method for application management.
Figure 4:
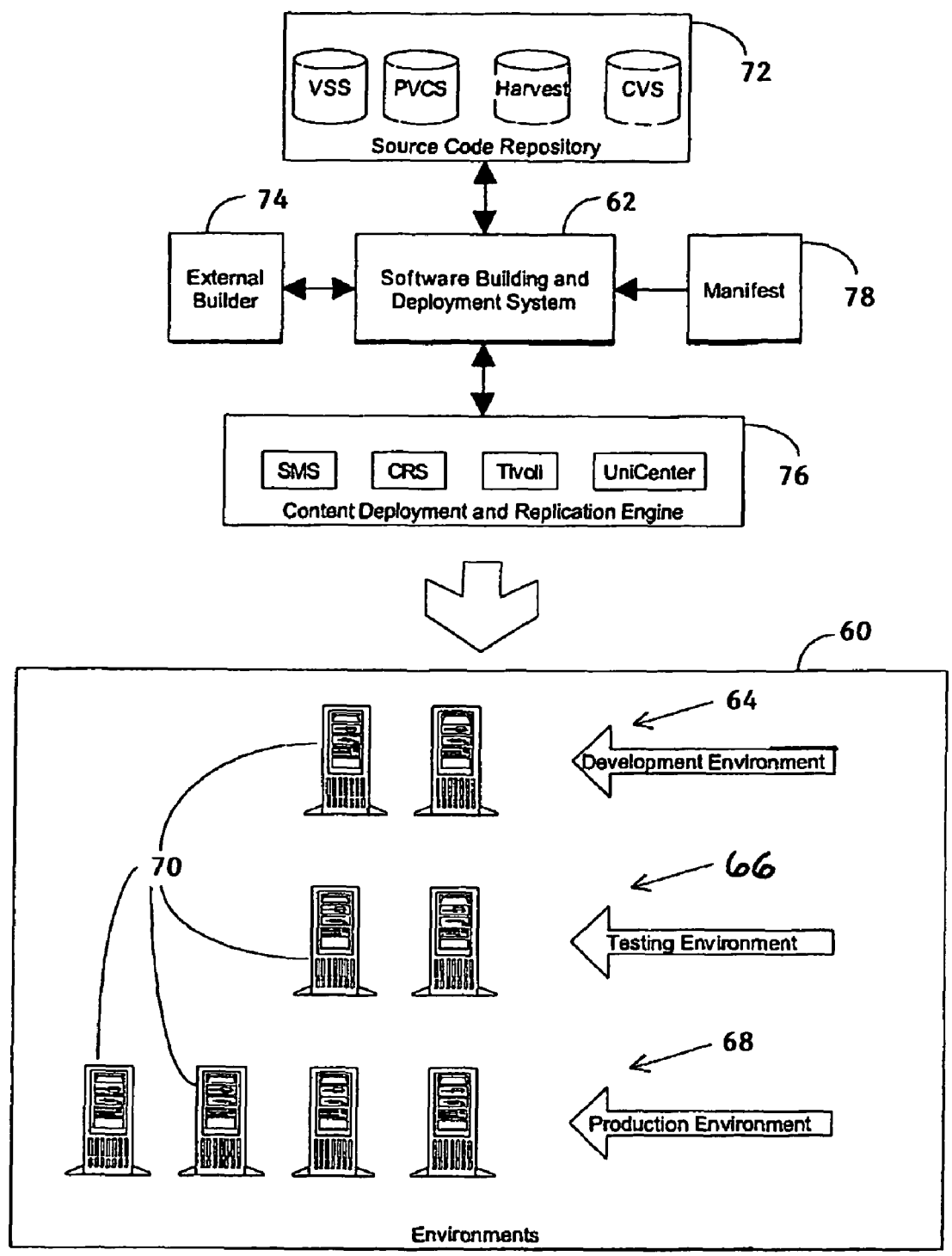
FIG. 4 illustrates a prior art system and method for software building and deployment.
Figure 5:
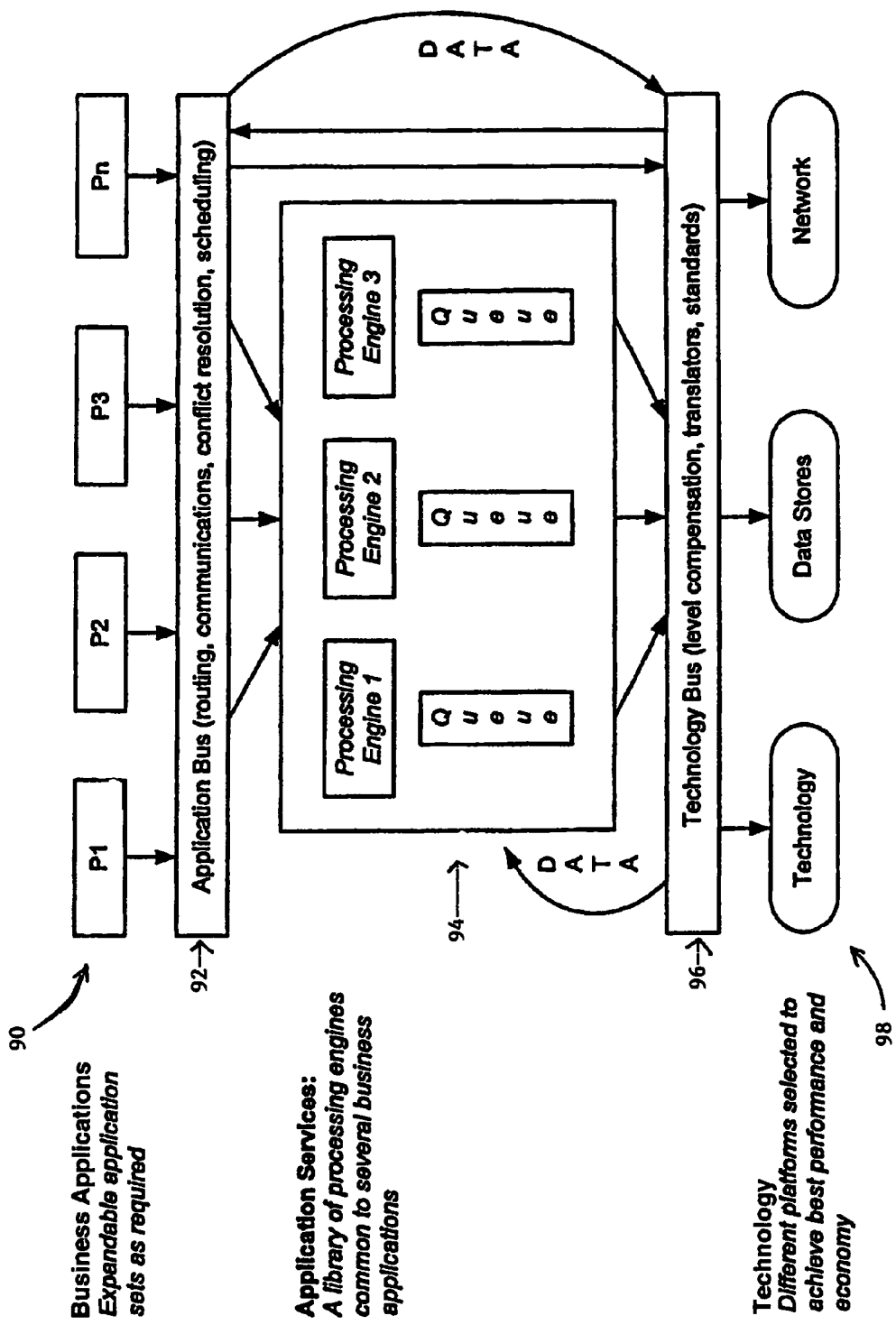
FIG. 5 illustrates a prior art method and apparatus for software deployment.

The following description includes many specific details. The inclusion of such details is for the purpose of illustration only and should not be understood to limit the invention. Moreover, certain features which are well known in the art are not described in detail in order to avoid complication of the subject matter of the present invention. In addition, it will be understood that features in one embodiment may be combined with features in other embodiments of the invention.

In accordance with at least one embodiment of the present invention, a framework for configuration and release management of group application systems software is provided. In particular, the framework of the present invention may provide for the configuration and release management of group application systems software in, for example, an account management system, both globally to the account management system and locally to business units within the account management system.

The global framework of the present invention includes various features that result in an improved method for configuration and release management of group application systems software in an account management system, and in particular a credit card account management system. Such features may include, for example, a single set of libraries that contain common card processing system elements (e.g., the "global version" of the system); policies, processes, and procedures that allow for consistent use of and modifications to common card system elements; regional load module libraries to manage installation and distribute revised card system elements at a specific site or for a set of time zones; individual code libraries for SBUs that contain business unit specific modifications to meet local needs (e.g., local modifications that supplement or replace global business processing); individual execution environments (e.g., online and batch) to support data management and processing for each SBU; and naming standards to control and identify components, libraries, data sets, and execution environments.

The framework of the present invention has been built and enhanced on the premise that common functions can be provided through a single set of "base" source code, while allowing country- or SBU-specific processing through modifications, control parameters, and the integration of locally-developed solutions. The present invention provides a global framework to manage the source code and related components that provide executable production environments to support business software applications.

The global framework of the present invention is both a structure and a set of associated tools and processes that allow a single base of program code and related components to be managed and modified, thereby meeting the processing needs of business units through the use of a common account management system. The global framework provides flexibility to incorporate software changes as business needs evolve, while keeping code release versions consistent and current across all business units within the account management system. This flexibility results in an improved speed-to-market for changes to the account management system.

The global framework of the present invention includes various features and components for configuration and release management of group application systems software. The global framework includes source, copybook, load module, and related libraries used to contain components of the card processing system. Such components may include, for example, JCL, PROCs, control cards, etc. The global framework includes naming conventions to ensure segregation and control of both global and SBU-specific components, libraries, and datasets for development, testing and production. The global framework includes a comprehensive change management structure that controls the use of software version promotion levels as described herein. The framework supports the concurrent development of components within the framework. In one example, the component change management tool used in conjunction with the framework and processes described herein is ChangeMan®, sold by SERENA Software, Inc. of San Mateo, Calif.

The global framework of the present invention in combination with its associated tools, processes, and procedures effectively deliver group application systems software within an account management system. The global framework provides standardized tools and techniques for concurrent development of software for multiple SBUs from a single source platform. In doing so, the global framework significantly reduces the number of system components for which changes need to be managed for users of a particular group system.

The framework of the present invention may be used in connection with any entity (e.g., vendor, governmental agency, in-house developer, etc.) that provides updates or changes to an application-based software system such as an account management system, a credit card account management system, or other financial services system. Possible software updates may include, for example, compliance updates, enhancement releases, and fixes.

Compliance updates address any changes to operating regulations, for example, by a credit card provider (e.g., Visa, MasterCard) or by a governmental agency (e.g., Sarbanes-Oxley, etc.). For example, Visa and/or MasterCard operating regulations change on a regular basis to meet the needs of all credit card issuing and acquiring members. As a result, payment card association members, banks, and processors must comply with these amendments on a set schedule. These mandates are usually effective on the first of April and the first of October of each year. A software vendor or in-house developer develops compliance updates for all components within a credit card account management system. These compliance updates are delivered by the vendor or in-house developers typically in late February and August. The credit card member then accepts these updates for integration into the specific version of the credit card account management system.

Enhancement releases address any new features and functionality that are added to, for example, the credit card account management system. These releases may be created by a vendor, or may be created in-house. Typically, vendor enhancements are delivered every twelve to eighteen months, and are packaged as a new release of the business system. The vendor's enhancement releases are integrated with a credit card member's version of the credit card account management system for delivery in an internal enhancement release.

Fixes may be released by a vendor or by in-house developers to correct any specific software problems or to update system processing based upon the business needs of a specific SBU.

For efficient release management of group application systems software within the account management system, the framework of the present invention controls the libraries and environments used in production and release testing. The framework supports the current version of the account management system in production, and release versions of the framework which allows for the development and testing of a software release to be implemented at the SBU level. More than one version of the global framework can be created to support multiple SBUs each operating on a different release version of the account management system. The previous software version of the account management system continues to be used by SBUs that were already using it in production, until such time as they are ready for conversion to a later release version of the account management system.

In some embodiments of the present invention, promotion features are provided in connection with the promotion of a software fix, enhancement, or release within the global framework. The lifecycle of a fix, enhancement, or release starts with development of source code changes and ends with installation and implementation. The developer of the software, using change management software such as ChangeMan®, initiates a process that incorporates all software components affected by a change. Upon successful completion of development and unit testing, the developer initiates the promotion process. The promotion process leads to the migration of the appropriate components from the current level of development or testing to the next higher level of testing (e.g., within the global framework). This process continues until the package is determined to be "production ready," at which time the package is installed.

The installation process of the present invention is initiated after extensive testing to ensure that the load modules and related components are production-ready. This testing results in a certification by the system that the modules and components are ready for installation. Load modules are installed via the change management software package into load module libraries, based upon a predefined schedule for the package. The package of software changes is installed, for example, in the corresponding library or libraries for the global account management core system or in an SBU-specific library or libraries.

In change management software terminology, the final step after a change management software package has been installed in the correct libraries, according to the predefined schedule, is to "baseline" the amended components. This baseline process takes place in the account management system component libraries. At this point in the process, the status of source code, copybooks and associated components is defined as "baselined" and they become a permanent part of the corresponding base account mangement system libraries. Any development or test versions of source, copybooks or other components that were created by the package during its transition from development to production installation are eliminated through an automated process.

As described hereinabove, the global framework of the present invention is made up of component management structures, referred to herein as "layers," configuration management and reporting tools, naming standards, and library types. Each of these features of the global framework is described in detail hereinbelow, in connection with FIGS. 6-16.

Figure 6:
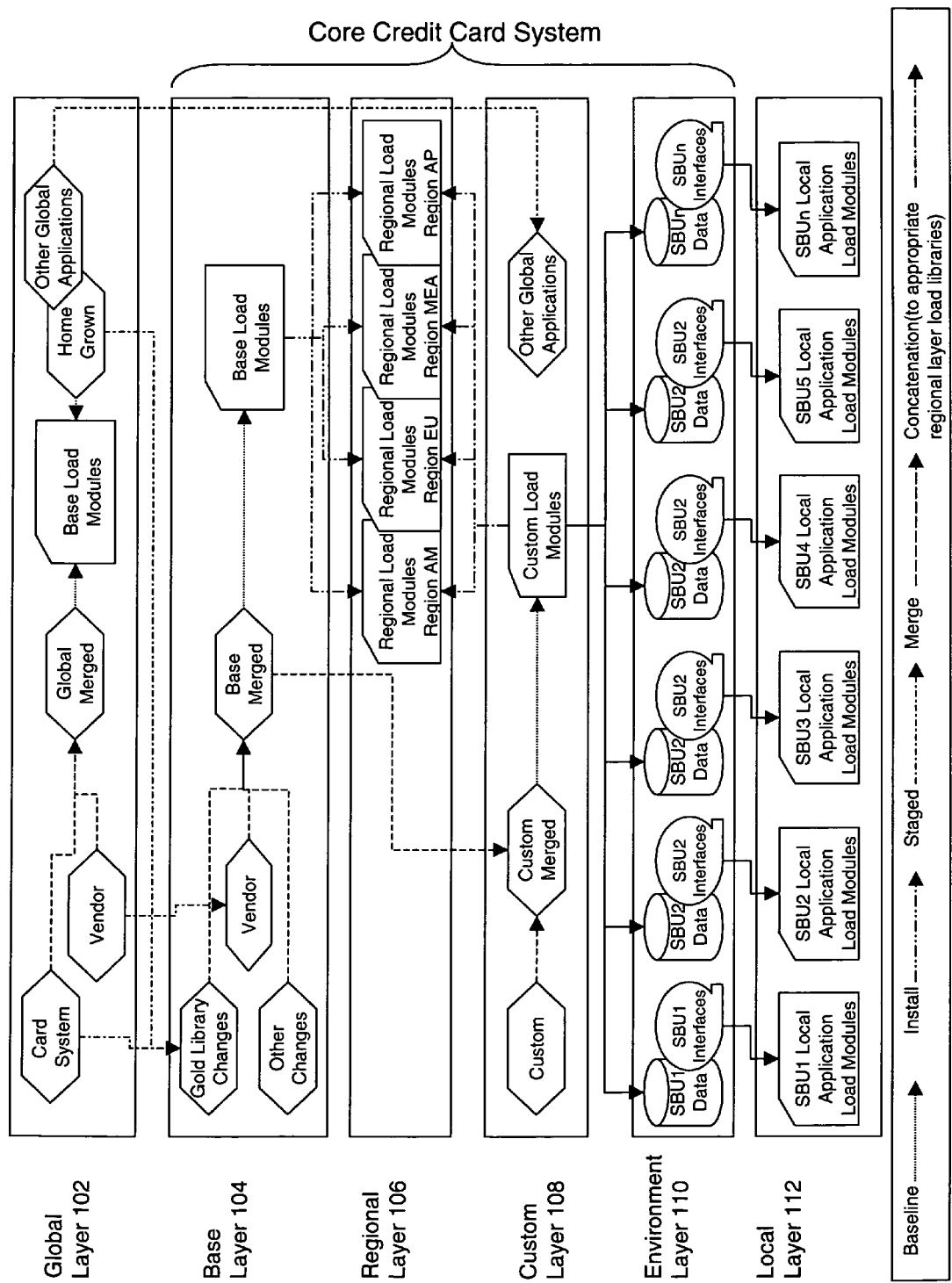
FIG. 6 is a schematic diagram of an illustrative global framework including a plurality of layers in accordance with some embodiments of the present invention.
Figure 7:
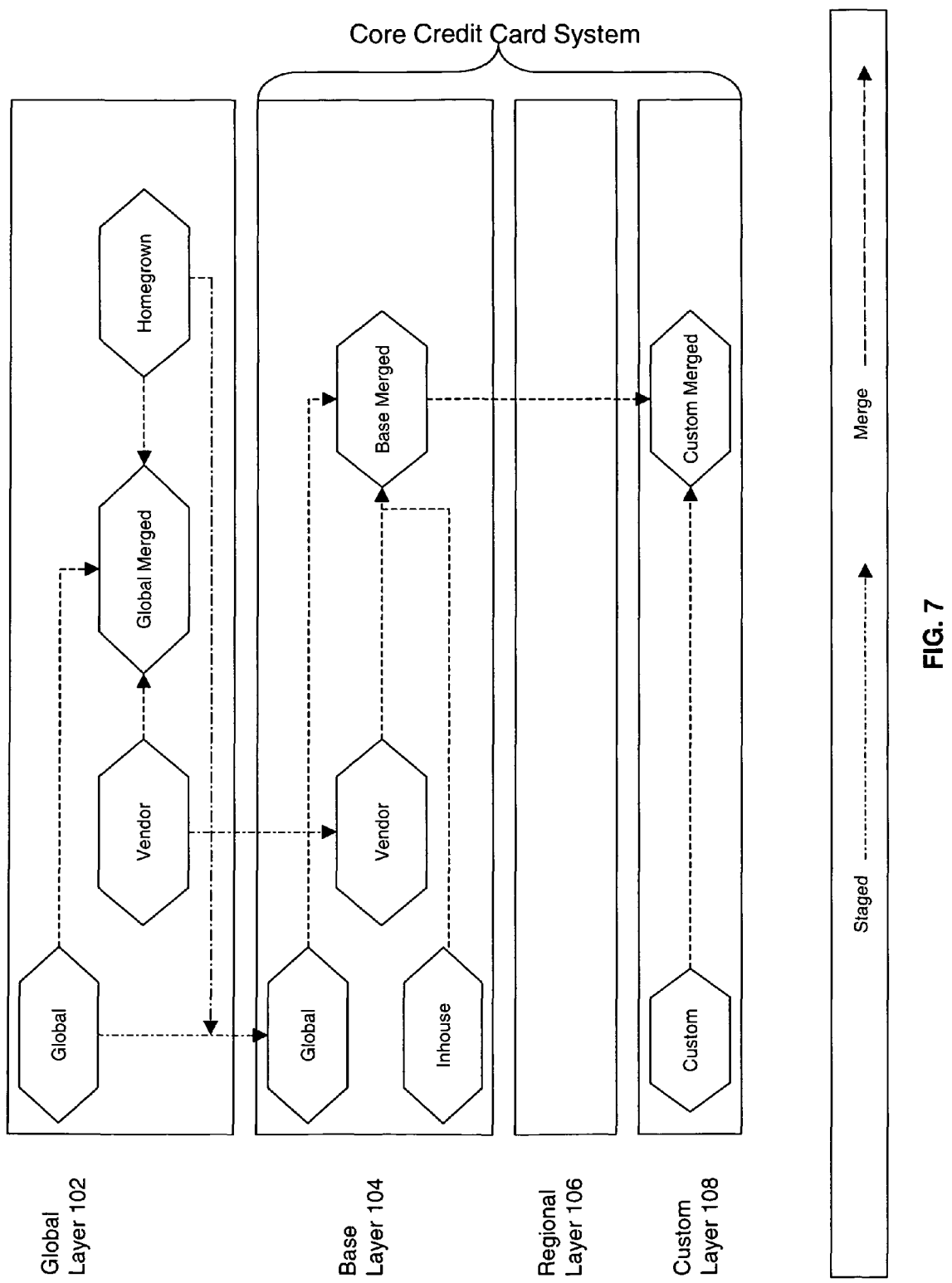
FIG. 7 is a schematic diagram of an illustrative process for creating multiple sets of copybook libraries for the global framework in accordance with some embodiments of the present invention.

The global framework of the present invention includes a number of layers to support segregation of globally-applicable software solutions from those that apply to specific SBUs. These layers advantageously permit the use of a single base of global source code and components to be used as the foundation for all account management system users, while still supporting the specific needs of each SBU. The global framework may include any number of layers. As shown in FIG. 6, for example, the global framework is illustrated as including six layers. This example is merely illustrative, however, and the framework may include some, all, or additional layers to the six shown in FIG. 6.

FIG. 6 illustrates the following six layers: global layer 102, base layer 104, regional layer 106, custom layer 108, environmental layer 110, and local layer 112.

Global layer 102 provides a development environment for software developers in, for example, a credit card processing system. Global layer 102 acts as the initial point at which vendor source code/copybook enhancements are integrated with the custom enhancements created by in-house developers on behalf of all SBUs. Global layer 102 supports the process of merging the two compatible sets of source code and copybook libraries into a full set of merged programs (source code and copybooks) that forms the foundation of the global account management system, so that the merged programs can be compiled and preliminarily tested.

In addition, homegrown applications which are an integral part of the overall account management system , are developed, compiled and tested as part of the global layer 102, prior to staging into base layer 104 (staging described in more detail hereinbelow).

Upon successful testing of enhancement releases and fixes at global layer 102, changed components are staged to the appropriate libraries at the base layer 104 for integration, testing, and subsequent installation in the production environment.

Base layer 104 provides support for the development and installation of all sub-systems. Vendor and homegrown solutions are integrated into the global card system at base layer 104. In addition, in-house developers may apply further fixes and modifications to the system at base layer 104, as needed.

The process at base layer 104 involves the merging of homegrown changes with vendor-supplied source code and copybooks to create a merged base set of libraries for source code and copybooks. Upon completion of integration and testing of these changes in the appropriate base layer environments, system global load modules are installed at regional layer 106.

Regional layer 106 provides a point at which production load libraries are distributed to support execution in batch or online. Regional layer 106 contains an exact copy of the execution libraries for base layer 104 load modules, so that individual SBUs can easily access the appropriate components in a local operational environment (e.g., environment layer 110). This is accomplished through concatenations of load module libraries.

Regional layer 106 load module libraries eliminate reliance on a single physical set of base layer 104 libraries for load modules. These load libraries are protected such that developers cannot change their contents, except through the authorized promotion/installation processes defined within the change management software at base layer 104 (described hereinbelow).

Custom layer 108 provides a number of advantages to the SBUs in the system. For example, custom layer 108 minimizes the time to market for minor releases and fixes within the global framework. Custom layer 108 provides the ability to maintain the integrity of the global system solution through code management tools and infrastructure. Custom layer 108 provides support for the evolution of solutions that have already been proven at the SBU level to be deployed globally as part of a major release.

Custom layer 108 provides the ability for each SBU to identify and implement processing rules and data that are specific to local market needs. A custom layer 108 exists for each SBU and includes of a set of component libraries that are used for development of SBU-specific source code/copybook changes and additions to the system.

Changes that are made at custom layer 108 by in-house developers are merged with corresponding source code and copybooks that have been created at base layer 104, similarly to the changes made at global layer 102. This merge is accomplished through change management software tools and promotion levels. Changes are developed, tested, and promoted through necessary environment levels, until they are ready for installation. At that point, in-house developers request an install of the package through the change management software. As a result of the installation via the change management software, the changes are baselined within custom layer 108.

New or modified components that exist in custom layer 108 may be accessed during execution by use of concatenations of the load module libraries within JCL that will point to the custom libraries first. If any given component is not found at custom layer 108, regional layer 106 load module libraries will be used.

Environment layer 110 is the operational processing environment in which all card system applications execute and where data files and databases are controlled and updated. It includes batch and online processing environments that support testing and production requirements. Environment layer 110 contains a complete set of databases, files and execution environments for each SBU. A distinct environment (batch and online) is created for each testing level required to support the SBU, as well as for production. The data files and databases are updated in at least one embodiment, for example, only by system applications.

Data and information that are required for processing outside the scope of the system for applications developed and maintained by SBUs are supported through interfaces (e.g., typically files) created for the express purpose of providing operational data to these systems. Development required to create these interfaces may be done at custom layer 108 by in-house developers. This process ensures full operational control by the primary production systems while still permitting each SBU to access information required for additional processing functions to meet local requirements.

Local layer 112 is a complete environment created for each SBU that contains non-card system application load modules that are used by an SBU and are dependent on system data. These applications may receive interface data from environment layer 110 during or after execution of system applications, as well as from other systems sources. The definition, development, and maintenance of these local applications may be managed and controlled by staff at the SBU.

As described hereinabove, the framework of the present invention may include some, all, or additional layers to those layers illustrated in FIG. 6, namely, global layer 102, base layer 104, regional layer 106, custom layer 108, environment layer 110, and local layer 112. In some embodiments of the present invention, for example, the framework may include only base layer 104 and custom layer 108. The use of base layer 104 and custom layer 108 allows global changes to be staged into base layer 104, and local changes specific to only a portion of the SBUs to be staged into custom layer 108.

Change management software, e.g., ChangeMan®, is the primary tool used to support the development and installation of various types of source code, copybooks, load modules, and other components in the mainframe environment. The change management software tool automates the full lifecycle of movement of system development components from development/testing through quality assurance ("QA") and installation into production.

Change management software provides a wide range of features. For example, the software guarantees coordination of all components of a defined package for simultaneous promotion. The software supports concurrent development and maintenance of components by multiple developers. The software prevents version discrepancy and out-of-synch relationships through the use of auditing tools. The software provides notifications of activities and online access via reporting tools. The software maintains historical records of changes to components. The software supports the ability to rollback changes to specific versions.

Change management software uses the concept of a package of components created by developers to identify changed components. These packages are used for analysis and promotion to the correct testing environment or for installation into production. Change management software also provides automated back-out procedures for packages to support recovery of previous versions of components.

The change management software manages the correct creation of packages and their contents through the use of partitioned datasets ("PDS") that store required components (e.g., source, copybooks, Job JCL, PROCs, etc.). A promotion level supports an environment occurrence (online and batch) to be used for a specific purpose, such as development/ unit test, conversion, training, QA, etc. Each promotion level includes a set of libraries that support the development/testing functions being performed. The set of libraries that exist at the promotion level includes support for the online (CICS) region, batch processing procedures (JCL and PROCs), datasets, and the PDS libraries for load modules, source code, copybooks, and associated other components necessary to describe the overall execution environment.

The major library types that require the most frequent manipulation and promotion are copybooks, source code, and load libraries (batch and online).

Copybooks (e.g., COBOL copybooks) are managed through the use of partitioned datasets controlled by the change management software. A copybook PDS contains a distinct member for each copybook. Naming conventions for each copybook library are used to identify the origination point (e.g., vendor, card system, etc.) of the code created for each copybook and the type of code that it is.

Copybooks may be, for example, data division statements or procedure division statements. Copybooks may be used, for example, for one of two reasons: the code is a candidate for use in multiple programs (e.g., COBOL programs) or it is a modification/enhancement to an existing vendor module/ program that exceeds five lines of code.

Each global framework layer described hereinabove and shown, for example, in FIG. 6, may have a set of copybook libraries to support the testing, installation, and distribution of global system application software. Depending on the layer and the number of environments required, there may be multiple sets of copybook libraries created to support development and testing needs. The process is illustrated, for example, in FIG. 7.

Figure 8:
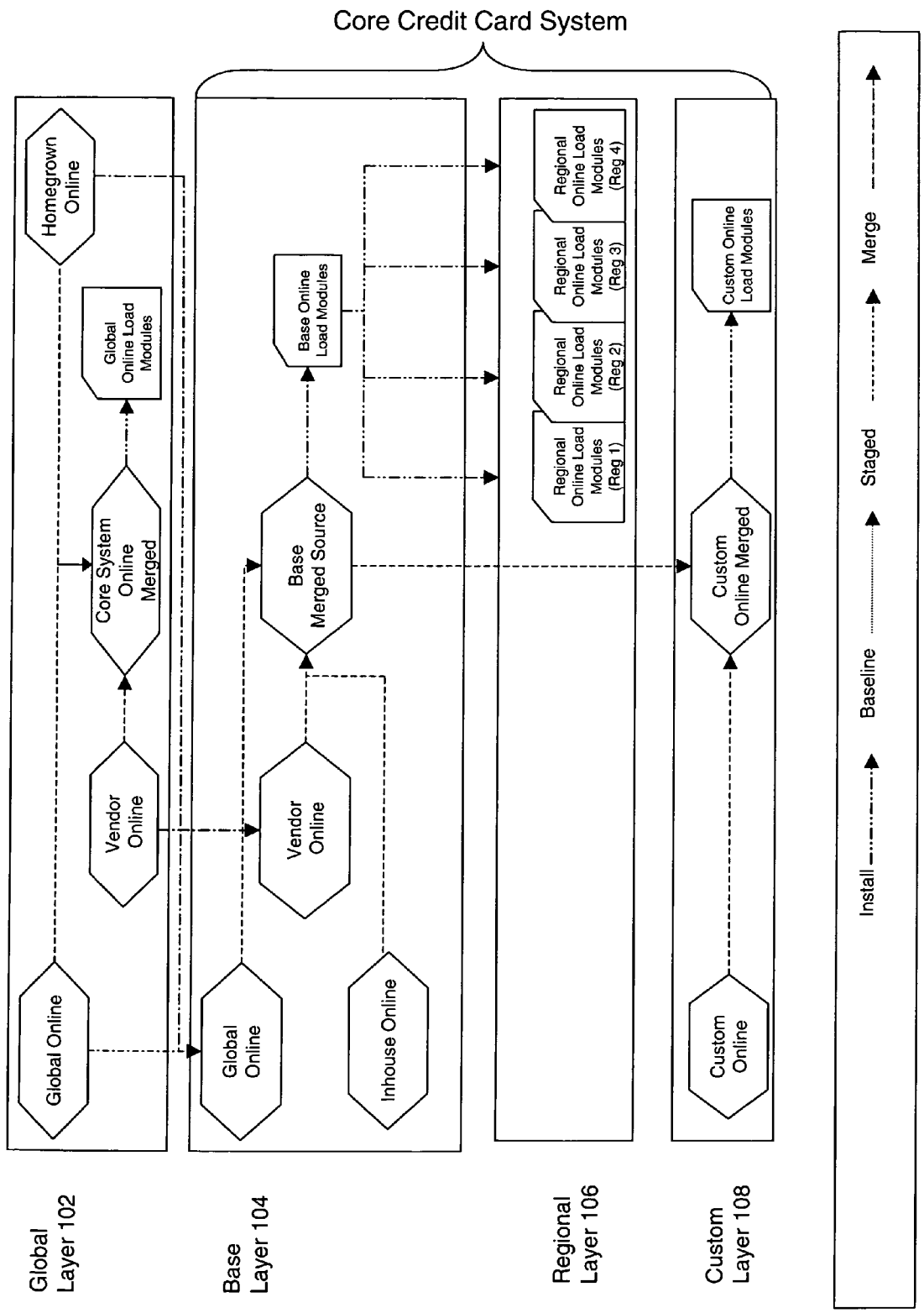
FIG. 8 is a schematic diagram of an illustrative process for creating multiple sets of online source code libraries for the global framework to support development and testing in accordance with some embodiments of the present invention.
Figure 9:
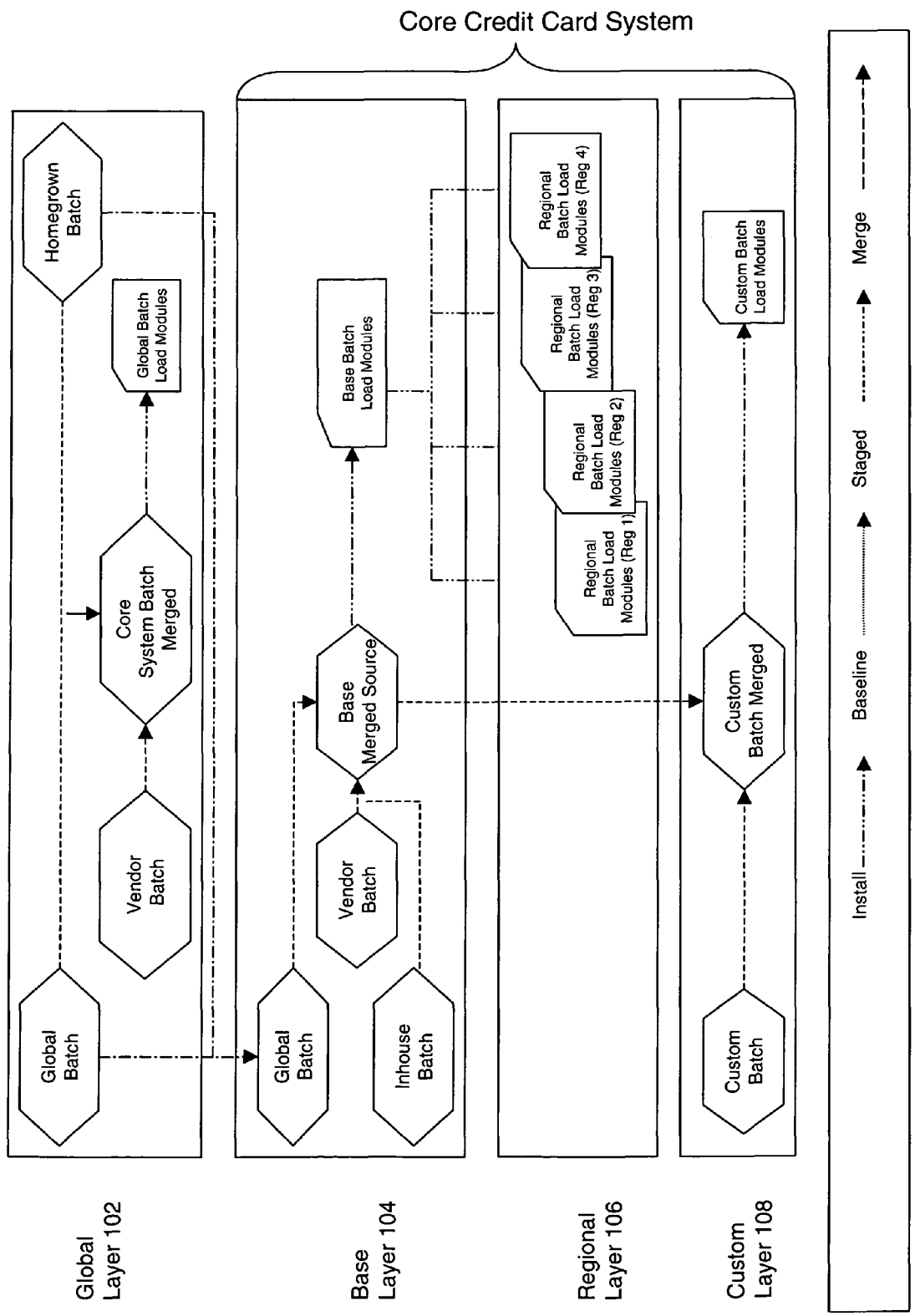
FIG. 9 is a schematic diagram of an illustrative process for creating multiple sets of batch source code libraries for the global framework to support development and testing in accordance with some embodiments of the present invention.

Source code is managed through the use of a PDS controlled by the change management software. Source code may be, for example, COBOL, Assembler, or any other suitable procedural language. Each global framework layer has a corresponding set of source code libraries to support the testing, installation, and distribution of the account management system application software. Depending on the layer and the number of environments required, there may be multiple sets of source code libraries created to support development and testing needs. These are illustrated in FIGS. 8 and 9.

Within the change management software, the proper identification of each component type requires the selection of the correct compile or assembly process to be executed to create load modules. In particular, system modules based upon the vendor-supplied system and the in-house version of this are subject to a merge process to combine the respective source or copybooks. Members of these merged libraries are then compiled/assembled. Other modules can be compiled/assembled without the need for merge. The change management software uses this component-type identification to determine which procedure needs to be invoked to create the corresponding load module.

The component, procedure types, and description of each is described in the table below:

| COMPONENT | PROCEDURE TYPE | DESCRIPTION |
|---|---|---|
| ASM | CMNASM | Assembler for in-house developed programs and BMS Maps that are not subject to the in-house version of the credit card system merge process |
| ASM | CMNMERGE | Assembler code that is subject to the in-house version of the credit card system merge process |
| COBOL3 | COBOL370 | COBOL source code that is not subject to the in-house version of the credit card system merge process |
| COBOL3 | CMNMERGE | COBOL source code that is subject to the in-house version of the credit card system merge process |
| COPYBOOK | CMNMERGE | COBOL copybooks that are subject to the in-house version of the credit card system merge process |
| JOB | JOB | JCLCHECK for jobs |
| MAPGNMRG | CMNMERGE | BMS Maps that are subject to the in-house version of the credit card system merge process |
| PROC | PROC | JCLCHECK for PROCs |

Load libraries (.PGM for CICS Online and .LNK for batch) are partitioned datasets (PDS) created to contain the programs that will be used for development, testing, installation, and execution in a production environment. An individual module in a load library is created as a result of a compile/ assemble requested by, for example, the developer of a program. The contents of these libraries are managed through the change management software promotion process, which controls migration through the use of promotion levels and change management software packages.

Each global framework layer has a corresponding set of load libraries to support the testing, installation, and distribution of the system application software. Note, however, that the global layer 102 set of load libraries is used for the migration process of merging vendor and in-house changes to form the system, and is used for development testing only. These load modules are not subject to promotion, migration or distribution to any other layer within the framework. System source code, etc. is staged into the base layer 104 change management software mnemonic before any compilation occurs at base layer 104.

In order to implement any type of change into the system production environment, a number of decisions need to be made. First is the criticality of the change. It is also important to determine whether the change is global in nature or applies to a single SBU. Finally, it is important to determine at what point in the development life cycle of the software the change can be introduced.

There are various categories of changes that may be made to the system. For example, compliance changes may be made to the system. These compliance changes may be mandated by a payment card association on a semi-annual basis, or by a governmental agency.

An enhancement may be made to the system. Enhancements include major and minor modifications to the system that address business requirements not present or adequately provided at present. These enhancements are usually made on an annual basis as a major release.

A fix may be made to the system. Fixes include minor and concise changes to functionality that improve the capabilities of the system but do not prevent day-to-day operations. Fixes are usually made on an annual basis and may be included in the enhancement release. Fixes may also be implemented on an ad hoc basis, at either base layer 104 or custom layer 108, as business needs demand.

Emergency fixes may be made to the system. Emergency fixes are changes required to system modules in the short-term to permit correct operations. These emergency fixes are infrequent but critical fixes.

Promotion levels are defined to accommodate the smooth transition of copybooks, source code, and other related components from the development environment through testing environments and for eventual installation in production. There may be, for example, six environments defined as standard for any SBU implementation (see, e.g., FIG. 13). This number of environments is merely illustrative, however, and any suitable number of environments may be used for SBU implementation.

The following table, "Promotion Levels—Base Layer 104," provides the corresponding standard promotion levels for both base layer 104 and custom layer 108. The following table also depicts how naming standards and conventions supports the various environments. A template for derivation of names for promotion levels for all SBUs is also provided hereinbelow as "Custom Layer 108 Template."

The change management software promotion levels are used by the developer in conjunction with a change management software package to collect components to be grouped together as part of a unit of change. It can include any component type. The developer is responsible for defining a package and then adding components to the package. These may be COBOL source code and copybooks, although the package may also include items such as JCL, Assembler programs, or BMS Maps (CICS screen definition macros).

Once the package has been defined and any assemblies or compiles completed, the package is eligible for promotion. Note that load modules are automatically added to packages. The developer will request promotion of the package to the next testing level as prescribed by the testing requirements of the overall project. Packages progress through testing levels via promotion to the point of certification that the contents are production worthy and are then subject to install.

Promotion Levels—Base Layer 104

| Level | CICS Region | Purpose | Promotion Level | Library Type Dataset Name(DSN) | | | ChangeMan ® Mnemonic |
|---|---|---|---|---|---|---|---|
| | | | | First Node | Second Node | Environments | |
| 1 | N/A | Development/Unit Test | L1AMDEV | D000. | CP000000. | D0B1 | W0B1 |
| 2 | N/A | Systems/Integration Test | L2EUSIT | D000. | CP000000. | R0B1 | W0B1 |
| 10 | N/A | Quality Assurance/User Acceptance Test | Q10APUAT | Q000. | CP000000. | Q0B1 | W0B1 |
| N/A | N/A | Production | N/A | P000. | CP000000. | P0B1 | W0B1 |

Custom Layer 108 Template

| Level | CICS Region | Purpose | Promotion Level | Library Type Dataset Name(DSN) | | | ChangeMan ® Mnemonic |
|---|---|---|---|---|---|---|---|
| | | | | First Node | Second Node | Environments | |
| 1 | H@B0 | Development/Unit Testing | L1DEV | D++0. | CP000000. | D&&& | W&&& |
| 2 | H@B1 | Systems/Integration Test | L2SIT | D++0. | CP000000. | R&&& | W&&& |
| 7 | C@B0 | Conversion | L7CONV | C++0. | CP000000. | C&&& | W&&& |
| 9 | T@B0 | Training | L9TRN | T++0. | CP000000. | T&&& | W&&& |
| 10 | J@B0 | Dress Rehearsal (QA/UAT) | Q10UAT | Q++0. | CP000000. | Q&&& | W&&& |
| N/A | P@B0 | Production (Install only; not promotion) | N/A | P++0. | CP000000. | P&&& | W&&& |

&&& = ChangeMan ® Mnemonic, last 3 characters

++ = Owner ID & Country/Framework ID

@ = Country ID

For Promotion purposes these are the only CICS Regions used.

Software is moved to Production as a result of a ChangeMan ® Install only.

CICS Programs are found in Library Type DSNs:

.PGM e.g. D2B0.CP000000.D2B1.PGM Development

Batch Programs are found in Library Type DSNs:

.LNK e.g. T2B0.CP000000.T2B1.LNK Training

The installation process includes multiple steps primarily controlled by the change management software package. While similar to a promotion, an installation is a prelude to the baseline process, which changes the status of the change management software package components and production execution libraries. Baselining a package and its contents permits components to be checked out by developer for further modification.

For packages that are part of base layer 104, the change management software install process copies load library modules that have been created as part of the package to the regional layer 106 load libraries, thereby making the load library modules available for execution in the corresponding production environment or environments.

When a package is installed at base layer 104, a duplicate copy of the load modules are created at regional layer 106. Changes are then available for execution by all environments to which regional layer 106 load libraries are concatenated.

This install process takes place according to the schedule defined in the change management software.

Load modules in the package are installed to all occurrences at regional layer 106 (e.g., the Americas, Europe, etc.). Upon completion of the last installation step in the schedule at regional layer 106, the load module is copied to the base layer 104 load module libraries and the baseline process of the package components occurs.

Figure 10:
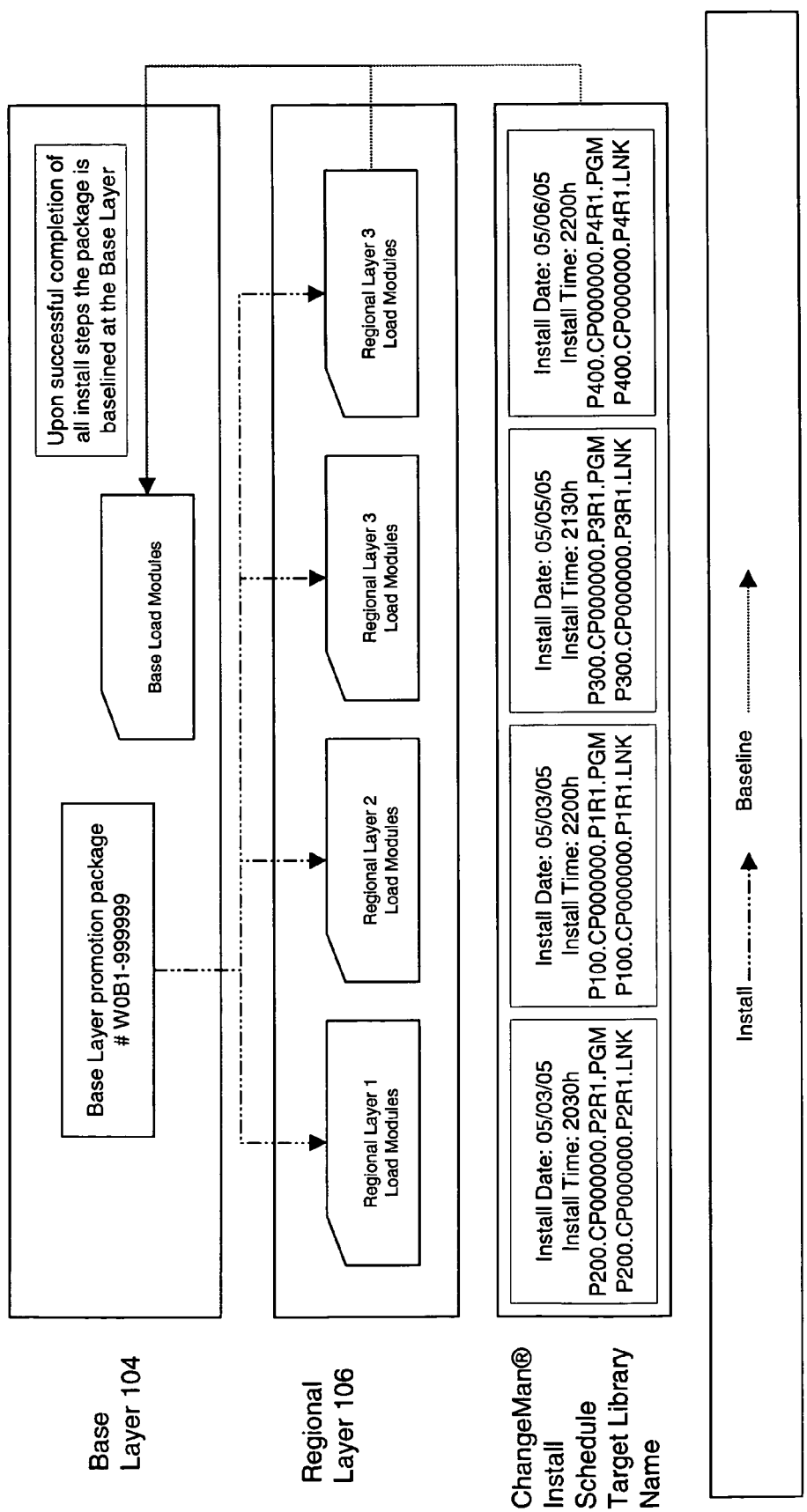
FIG. 10 is a schematic diagram of an illustrative process for scheduling of packages for installation at the base layer of the global framework in accordance with some embodiments of the present invention.

FIG. 10 illustrates the scheduling of packages for installation at base layer 104. Note that when scheduling the install, it is necessary for all steps to complete before the package contents are baselined at base layer 104.

Figure 11:
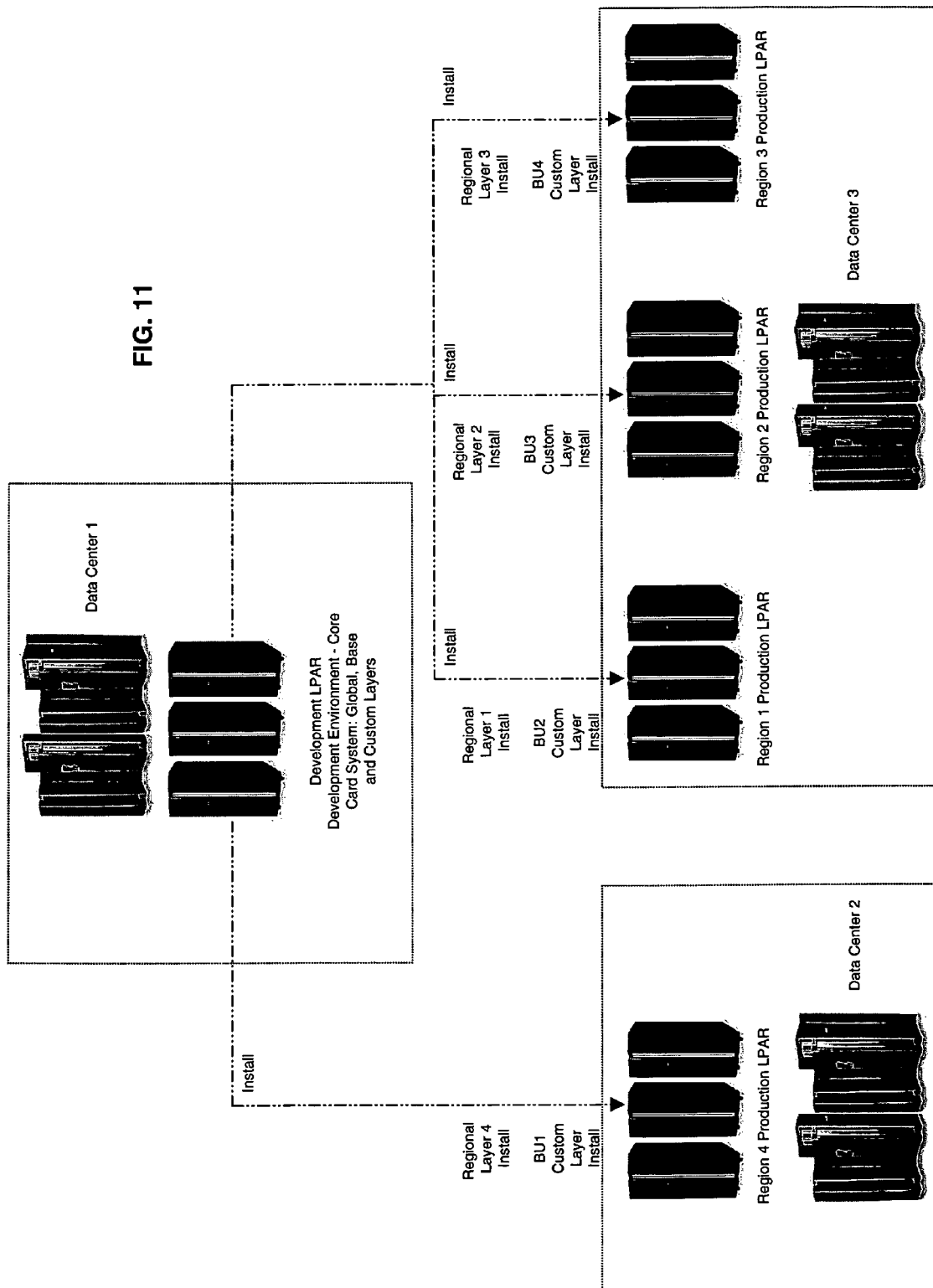
FIG. 11 is a schematic diagram illustrating the geographic distribution that takes place when an installation such as the installation of FIG. 10 is performed in accordance with some embodiments of the present invention.

FIG. 11 illustrates the geographic distribution that takes place when the install is performed. Load modules are copied from, for example, the central development Sysplex to the remote production Sysplexes at which the regional layer 106 load module libraries are maintained.

The change management software completes the baseline process when it has certified that all regional layer 106 installation steps have been completed successfully. Note that a copy of the regional layer 106 load module libraries is also maintained at, for example, the development Sysplex for redundancy purposes.

As shown in FIG. 11, for example, the installation of a change management software package to production initiates an automatic process. The installation results in load modules (batch and/or on-line) being copied, according to a pre-determined schedule, from the source load module libraries in the development LPAR to the destination load libraries—either regional layer 106 (using base layer 104 as source) or custom layer 108 (using custom layer 108 as source) LPAR(s). Upon completion of all scheduled installations for the change management software package, the package components are baselined at the corresponding source layer.

At the custom layer 108 for a specific SBU, the change management software install process copies load modules that have been created as part of the package to the custom layer production load libraries. These load modules are then available for execution in the corresponding SBU custom layer 108 production environment.

The install process takes place according to the schedule defined in the change management software. Upon completion of the custom layer 108 installation, the baseline process of the package components occurs.

The load modules in the package are installed to the production level set of load module libraries at custom layer 108, based upon the schedule defined in the change management software by the developer.

As noted hereinabove, the load modules are copied from, for example, the central development Sysplex to the remote production Sysplexes at which custom layer 108 load module libraries are maintained. Upon completion of the installation step, the baseline process of the package components occurs at custom layer 108.

Figure 12:
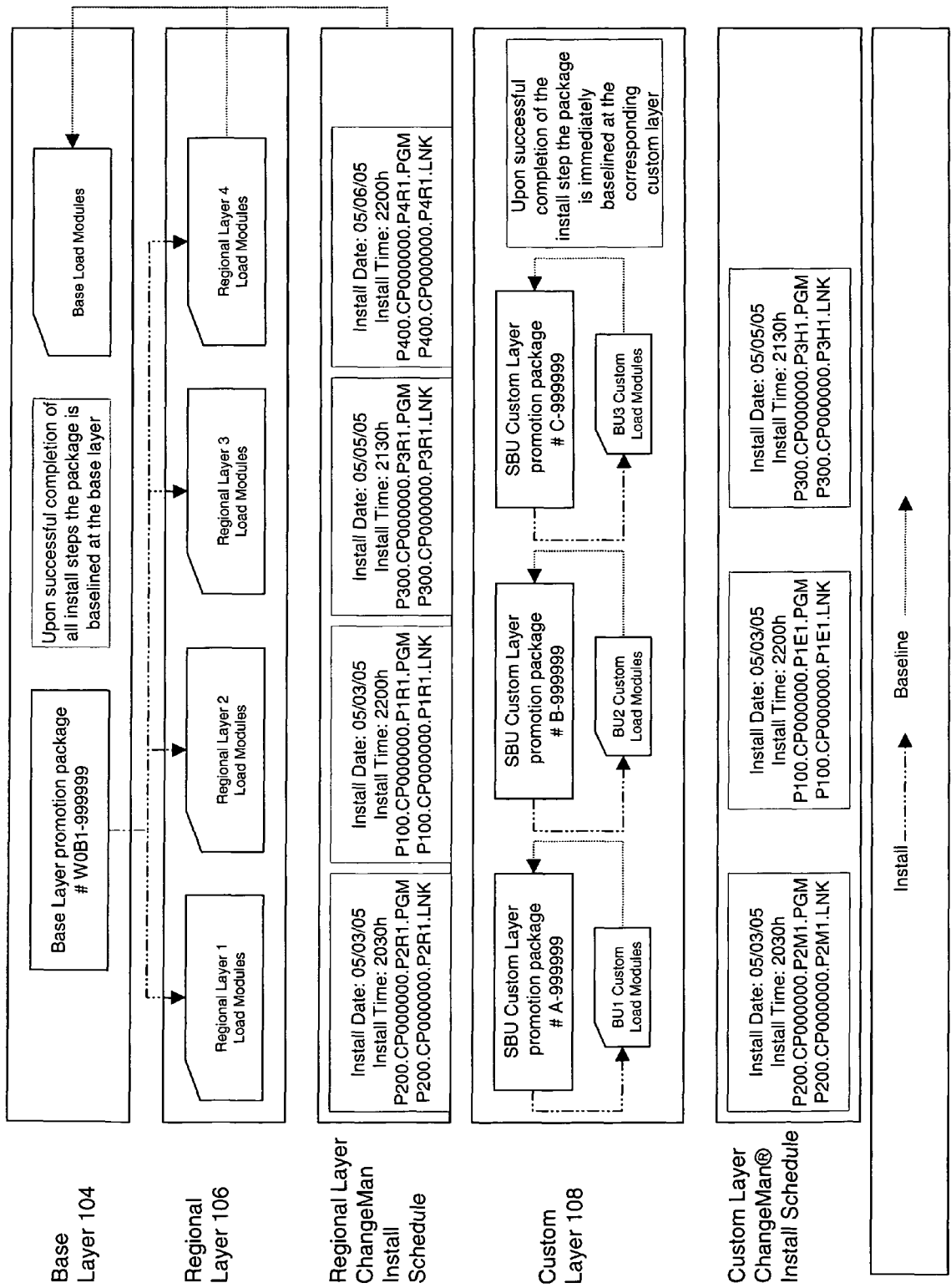
FIG. 12 is a schematic diagram of an illustrative process for change management software package installation and baseline processing in the global framework in accordance with some embodiments of the present invention.

The change management software package installation and baseline process are illustrated in FIG. 12.

Testing environments for certain layers of the global framework are created around, for example, the CICS region required for each level of testing and production for each SBU. Each environment incorporates both online (e.g., CICS) components as well as the corresponding batch components to support online processing.

The testing levels that are required for acceptable levels of quality in the production environment are described hereinbelow. Note that support for a primary development, systems test, QA/UAT, and production environment exists at both base layer 104 and custom layer 108. There is a one to one correspondence of libraries and testing levels to allow for a timely and consistent progression of changes through each development/testing level. Promotion levels are defined within the change management software for each of the testing levels to support progression of modifications.

Figure 13:
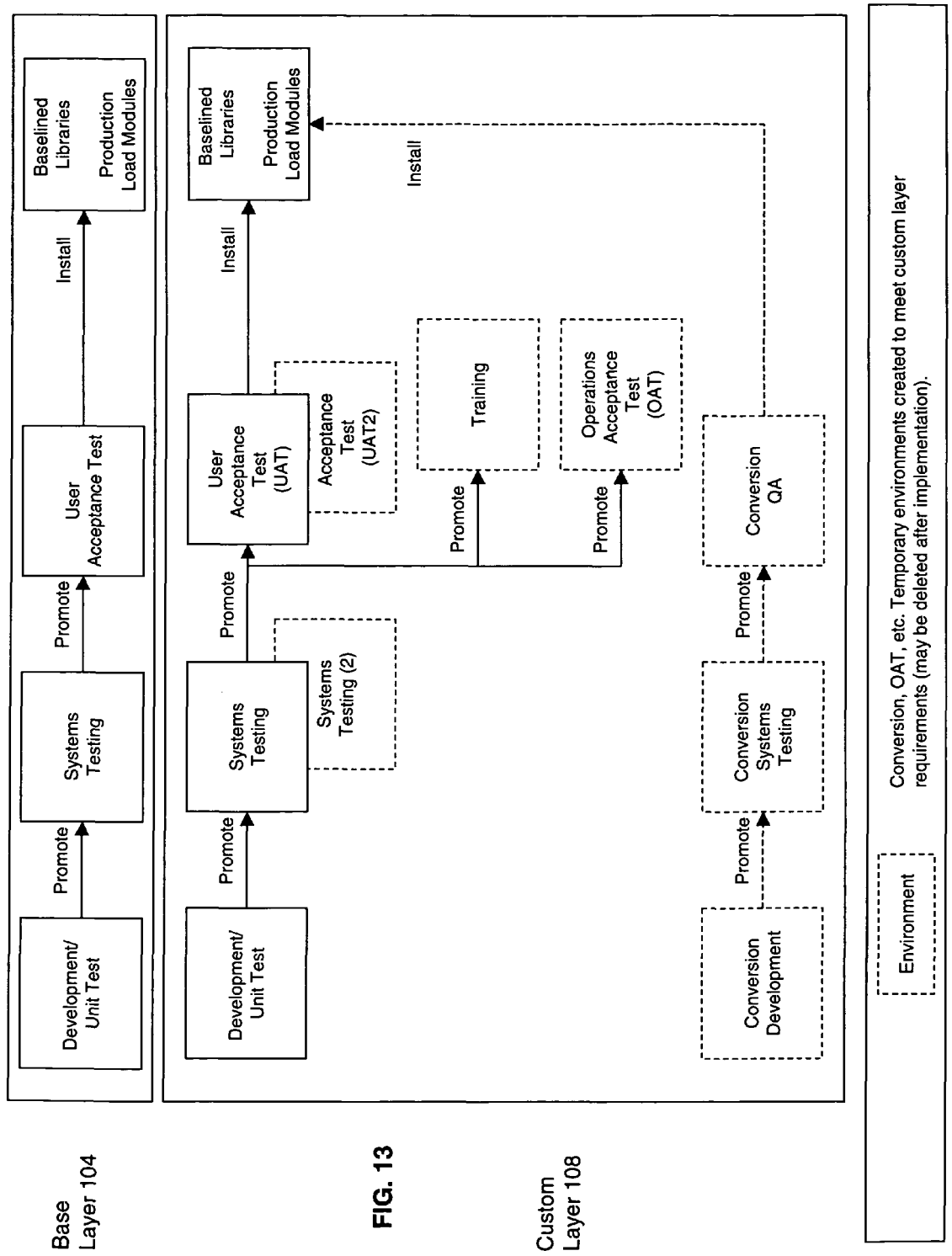
FIG. 13 is a schematic diagram of an illustrative process for promotion of changed components within the custom layer of the global framework for testing in accordance with some embodiments of the present invention.

As described hereinabove, changes to source code/copybooks are assigned to a change management software package within the change management software. These changed components can then be compiled into load modules that are added to the package for use in the testing and promotion process. The contents of the package then advance to the next higher level of testing via package promotion using the change management software. This process of promotion continues until all testing is completed and the package is installed. This installation occurs either at base layer 104 or custom layer 108, depending on the global or local applicability of the software. In particular, if the change is global in nature, and applies to all SBUs, it is installed in the regional layer 106 load module libraries. If the change is SBU-specific, it is installed in the custom layer 108 load module libraries. The installation process is illustrated in FIG. 13.

Naming conventions provide a convenient way for a systems development project to organize all of the components required during the process of creating solutions for a complex business problem. Naming conventions have many advantages. For example, naming conventions eliminate the likelihood of incorrectly naming an element. Naming conventions provide easy identification of what an object is used for. Naming conventions provide an improved ability to identify the SBU- or application-owner of the object.

Specific rules are defined for use in the generation of the appropriate dataset or library name for a given global framework layer. These standards support not only the management of software releases, they are also provided to permit differentiation of programs, libraries, and datasets at the SBU level.

Dataset names (DSNs) provide a way to identify files and databases that are used by batch and online programs. In an environment where many SBUs operate a single base set of an application, it is important to be able to segregate the files and databases by business owner. This is accomplished through the use of dataset naming standards in accordance with the present invention.

Libraries are used to store key components including program load modules, specific tables and codes, and control cards (CTCs) that manage the allocation of resources and determine processing needed at a specific processing point. Within a processing model where many SBUs operate from a single base set of an application, it is important to be able to segregate the base layer 104 libraries and SBU-customized libraries at the custom layer 108 by business owner. This is accomplished through the use of library naming standards in accordance with the present invention.

Job names are used to identify the batch execution job streams. To segregate and control each environment for individual SBUs, it is important to have unique job names that identify execution units for the local business unit. The job name is used in conjunction with job control language (JCL) to build specific batch execution streams. Each job name must be unique for scheduling purposes. This is accomplished through the use of the job naming standards in accordance with the present invention.

Procedure (PROC) names are used to identify "blocks" of JCL statements executed as part of a batch job stream that has a unique job name. To segregate and control each environment for individual SBUs, unique PROC names are used to identify execution units for the local business unit. This is accomplished through the use of the PROC naming standards in accordance with the present invention.

An account code is a five character code required to establish allocation of charges for use of physical resources in a mainframe environment. The account code identifies the environment, owner, country, and application to which the job belongs. This is accomplished through the use of the account codes naming standards in accordance with the present invention.

Individual change management software control libraries are uniquely identified through the creation of a mnemonic within the change management software. This mnemonic is used to differentiate projects, or occurrences of components within a project, to support control of those components. The change management software mnemonic for a specific layer, or occurrence within a layer, is derived using the change management software naming standards in accordance with the present invention.

Load modules, whether used for CICS online execution or batch program jobs, are stored in libraries. The load modules that form part of the card system reside in the base layer 104 load libraries. However, to permit graceful implementation and installation of changed application code, regional layer 106 contains a copy of the card system load modules maintained at base layer 104. This copy of the load modules eliminates reliance by all SYSPLEXES (which are geographically dispersed) on a single set of load libraries at a central location. A "SYSPLEX" is a collection of mainframe processors that share resources and provide a processing platform for many batch and online environments. It is used as a management point for all resources required to meet the needs of many general purpose business systems. A SYSPLEX may include, for example, CPU, memory, network connections, direct access storage devices (DASD), magnetic tape drives and other input and output media types.

Each SBU environment may have customized versions of modules that are to be executed in lieu of the load module that resides in regional layer 106. To properly facilitate this feature, libraries are concatenated in order from custom layer 108 to regional layer 106. "Concatenation" means that, when the module is to be invoked, the system searches first in the custom layer 108 load libraries for the module. If the load module is not found in the custom layer 108 load libraries, then the regional layer 106 load libraries are used to provide the load module.

Examples of the concatenation sequence for the production environments, to include regional layer 106 as well as custom layer 108 libraries, is shown in the table below:

| Type | Layer | Library Name |
|---|---|---|
| Batch | Custom | P2M0.CP000000.P2M1.LNK |
|  | Regional | P200.CP000000.P2R1.LNK |
| Online | Custom | P2M0.CP000000.P2M1.PGM |
|  | Regional | P200.CP000000.P2R1.PGM |

Figure 14:
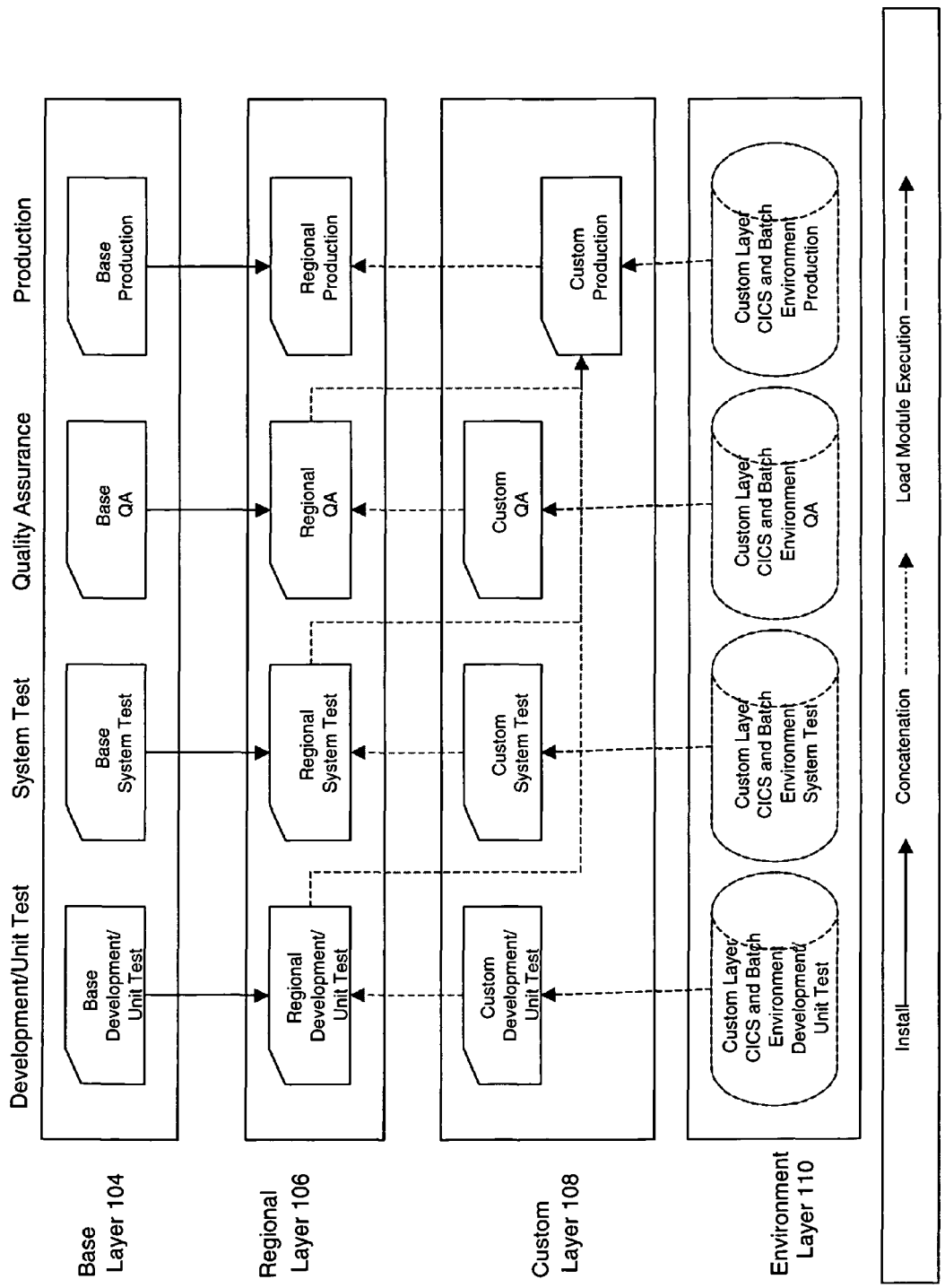
FIG. 14 is a schematic diagram of an illustrative concatenation process for each testing level of the global framework in accordance with some embodiments of the present invention.

The concatenation sequence is also dependent upon the test level for the environment. FIG. 14 illustrates a concatenation sequence for each testing level, as well as production environments. Examples of the concatenation sequence for the various test environments, to include regional layer 106 as well as custom layer 108 libraries, are shown in the table below:

| Layer | Library Name (Batch & Online) |
|---|---|
| *Development/Unit Test* | |
| Custom | D2M0.CP000000.D2M1.PGM & .LNK |
| Regional | D200.CP000000.D2R1.PGM & .LNK |
| Custom | P2M0.CP000000.P2M1.PGM & .LNK |
| Regional | P200.CP000000.P2R1.PGM & .LNK |
| *Systems/Integration Test* | |
| Custom | D2M0.CP000000.B2M1.PGM & .LNK |
| Regional | D200.CP000000.B2R1.PGM & .LNK |
| Custom | P2M0.CP000000.P2M1.PGM & .LNK |
| Regional | P200.CP000000.P2R1.PGM & .LNK |
| *QA (User Acceptance Test)* | |
| Custom | Q2M0.CP000000.Q2M1.PGM & .LNK |
| Regional | Q200.CP000000.Q2R1.PGM & .LNK |
| Custom | P2M0.CP000000.P2M1.PGM & .LNK |
| Regional | P200.CP000000.P2R1.PGM & .LNK |

As each SBU implementation team initiates the development and testing project, the creation of the appropriate global framework environment and card system infrastructure components will be requested. The global framework requires the definition and creation of a change management software mnemonic, library types, and libraries. Infrastructure components are composed of all technical aspects of the batch and online environment.

Upon establishment of the SBU global framework environment, in-house development teams can commence the modifications necessary to meet the business requirements for a specific SBU.

Changes made to card system source and/or copybooks using the global framework of the present invention can be at either base layer 104 or the custom layer 108. Changes at base layer 104 are considered to be "global" in nature, and therefore affect all SBUs. The base layer 104 load modules are executed unless overridden by changes applied at custom layer 108 to meet SBU needs.

Changes made at custom layer 108 are specific to the needs of a single SBU. When changes are made at custom layer 108, the load modules created as a result are executed in preference to those that exist at base layer 104. This is accomplished through the use of load module library concatenation, as described hereinabove.

A feature of the global framework of the present invention is a "shadow" framework for use in connection with enhancement releases. An enhancement release of a system requires the ability to manage and maintain the existing production environment and the supporting testing environments, while at the same time permitting development and testing of the next major release of the system. The nature and complexity of the system dictates that a separate and distinct framework, libraries and environments be created to provide a method to fully and successfully test global functions, as well as any SBU custom changes that have been made to the current version of the card system.

The shadow framework of the global framework is a "shadow" of all aspects of the existing global framework. This shadow global framework provides environments for the acceptance of a new release of vendor source code and copybooks that constitute the next release of the system (e.g., at base layer 104). This is supplemented by any in-house changes to the system, at base layer 104, for example, and additional functionality created for specific SBUs, at custom layer 108, for example.

The shadow framework of the present invention provides various advantages. For example, the shadow framework permits the acceptance of new releases of the system into a set of environments separate and distinct from production base-lined system libraries and change management software mnemonics. The shadow framework supports end-to-end testing of new releases at both base layer 104 and custom layer 108 prior to installation/implementation in a production environment. The shadow framework provides the ability to allow SBUs to begin using the new release of the account management system based upon their ability to manage the conversion to the new release.

The shadow global framework includes a complete set of change management software mnemonics, source/copybook libraries (using standard lib types), other source components, and load module libraries that support base layer 104 and custom layer 108. In addition, libraries also are provided at regional layer 106 to support geographic distribution of load modules.

Figure 15:
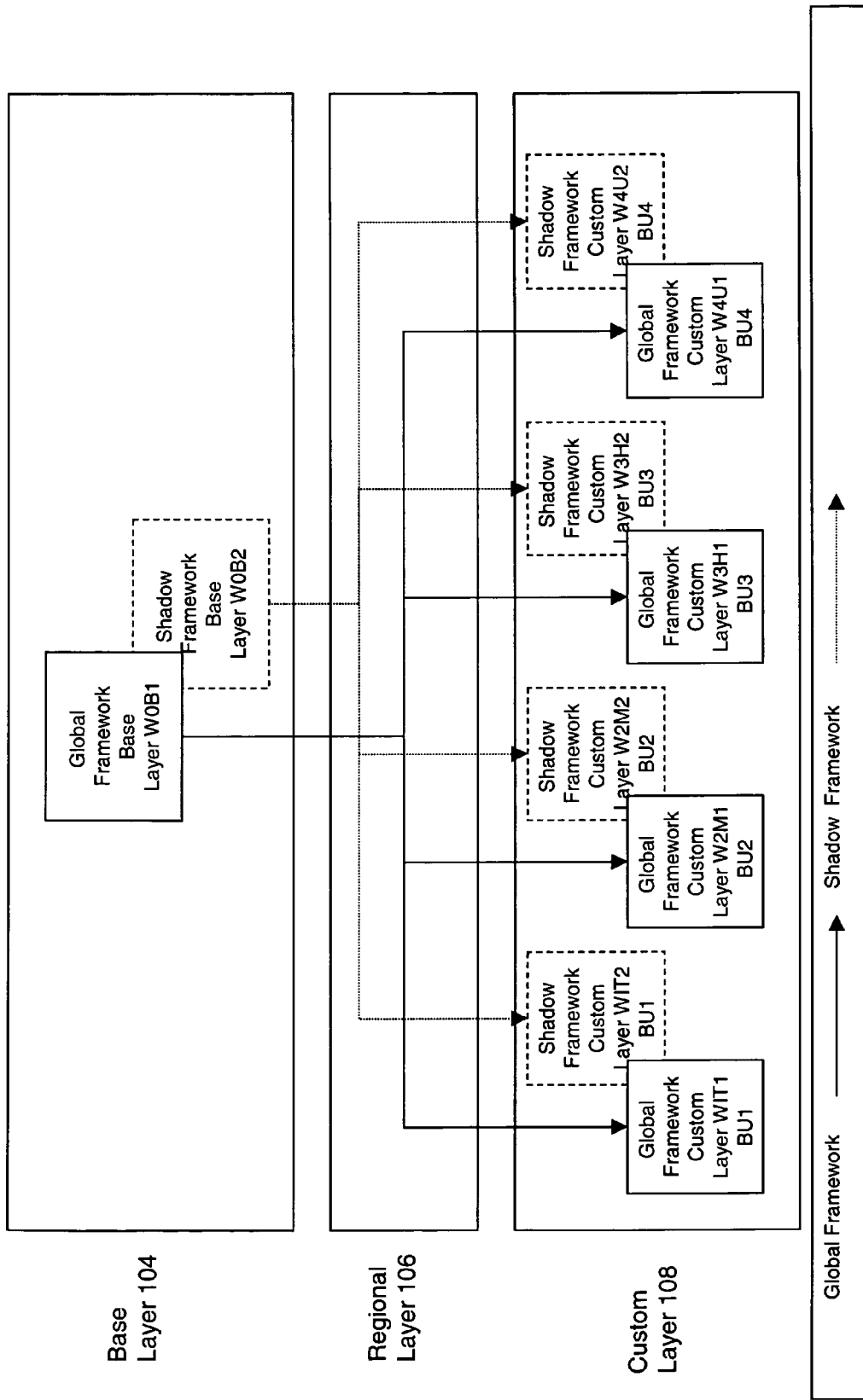
FIG. 15 is a schematic diagram illustrating the change management software mnemonics for each layer of the global framework and additional versions of the global framework for new releases in accordance with some embodiments of the present invention.

As can be seen in FIG. 15, for example, a change management software mnemonic exists for each layer of the framework that contains components that can be created and maintained within the system (e.g., source code, copybooks, etc).

Figure 16:
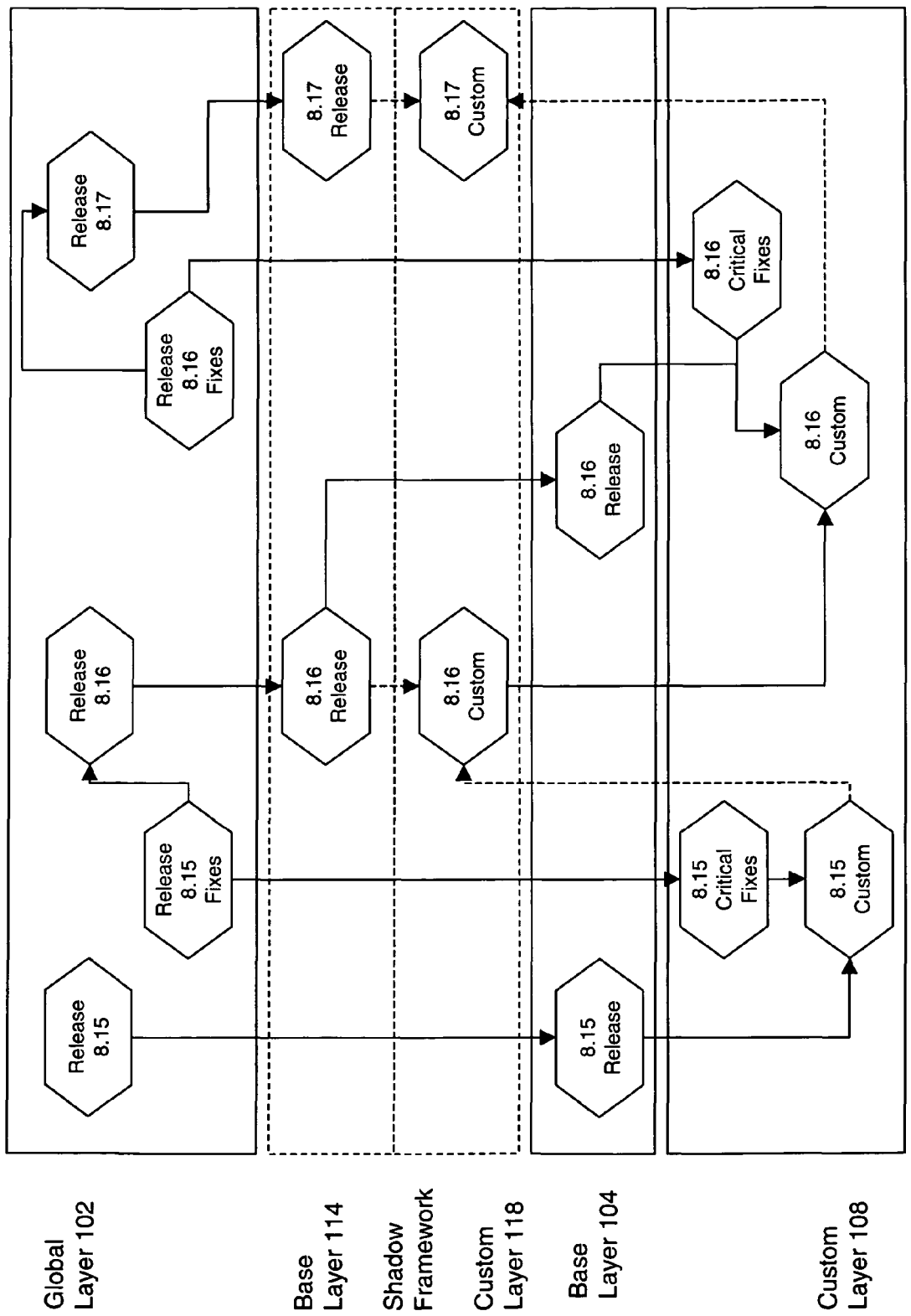
FIG. 16 is a schematic diagram of an illustrative process for development and testing of the next release to be implemented at the SBU level using the shadow global framework in accordance with some embodiments of the present invention.

For smooth migration of SBUs from one major enhancement release of the system to the next, it is important to control the libraries and environments used in production and release testing. The global framework of the present invention is used to support the current version of the system in production. The shadow global framework of the present invention provides the mechanism for the development and testing of the next release to be implemented at the SBU level. More than one shadow global framework can be employed depending on the speed at which SBUs are able to migrate from one release to another. This aspect of the present invention is illustrated in FIG. 16. (It should be noted that the release notations, e.g., Release 8.15, Release 8.16, etc., provided in FIG. 16 are merely for illustration.)

Upon delivery of an enhancement release from a vendor and/or from an in-house developer, it is staged into the shadow global framework base layer 114 for that release. In addition, the contents of the existing custom layer 108 change management software mnemonics are migrated to the new release shadow global framework (e.g., to shadow custom layer 118). This duplicate copy is used as the foundation for integrating release modifications and testing the new release.

Any customizations to the card system created by an in-house developer are reviewed in light of the contents of a vendor release. A determination is made as to what extent any fixes applied at custom layer 108 have become redundant due to enhancements at base layer 104. Changes that are no longer needed at the custom layer 108 are removed and components are scratched or recompiled as required.

As changes can be introduced at custom layer 108 for an SBU-specific business requirement, it may be necessary to modify SBU-specific enhancements that will continue to be supported at custom layer 108. For example, this could be due to changes to files, copybooks, or source code used from base layer 104 as the basis for custom layer 108 enhancements.

All application sub-systems may use the shadow global framework for development of the next release of the card system. In particular, the release of any major enhancements to the system may be integrated and tested in the corresponding shadow global framework environments before installation into production.

Upon successful integration of source code/copybooks at base layer 104 and custom layer 108, full testing of the new release of the system is conducted prior to implementation in production.

Once the latest release of the system is certified as production ready and has been installed, the shadow global framework becomes available for use by SBUs, either as a conversion from a previous version or as a new SBU added to production. The global framework may be implemented with, for example, an IBM mainframe environment using standard operating systems and tools, such as z/OS1.6, TSO, CICS, ChangeMan®, etc.

Various features of the present invention will be described hereinbelow in connection with the flow diagrams illustrated in FIGS. 17 and 18.

Figure 17:
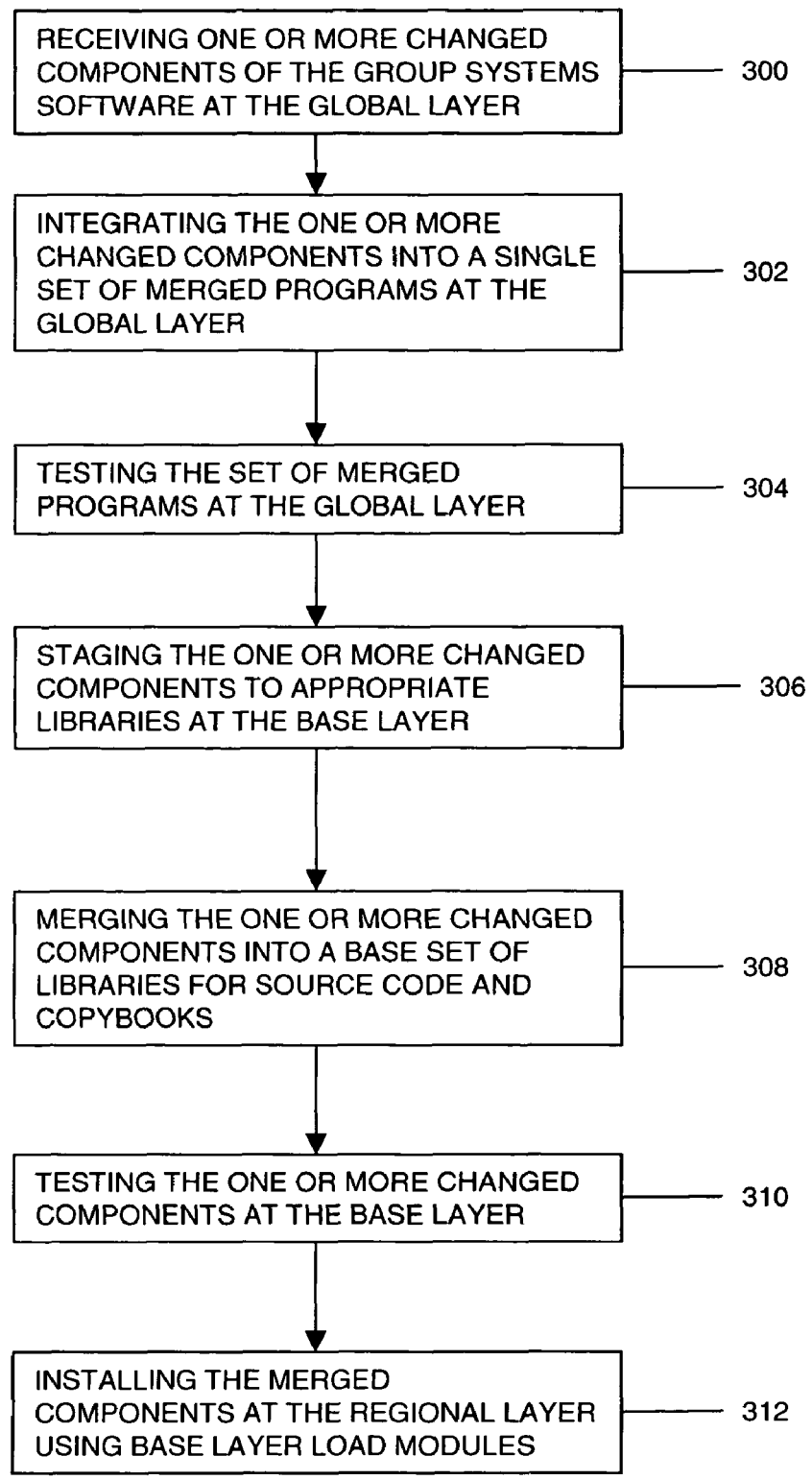
FIG. 17 is an illustrative flow diagram that demonstrates the configuration and release management of software globally to the account management system in accordance with some embodiments of the present invention.

FIG. 17 is an illustrative flow diagram that demonstrates the configuration and release management of software globally to the account management system. At step 300, one or more changed components of the group application systems software are received at the global layer (e.g., global layer 102 of FIG. 6). At step 302, the one or more changed components are integrated into a single set of merged programs at the global layer. An example of this integration is shown in FIG. 6, with "Vendor" and "Card System" changes integrated into a single set of "Global Merged" programs at global layer 102. At step 304, the set of merged programs are tested at the global layer. By testing at the global layer, developers are free to test and further develop the software components without disrupting the processing of the remaining portions of the global framework, especially of software components used in production by SBUs.

At step 306, the one or more changed components are staged to the appropriate libraries at the base layer. As shown in FIG. 6, for example, the "Card System" and "Vendor" changes are staged to base layer 104. At step 308, the one or more changed components are merged into a base set of libraries for source code and copybooks. FIG. 6, for example, illustrates "Base Merged" as the merger of the "Gold Library Changes," the "Vendor" changes, and any other changes integrated into base layer 104. The one or more changed components are tested at the base layer at step 310. An example of testing support at base layer 104 is shown, for example, in FIG. 13, which illustrates the promotion of a component up to the installation step. At step 312, following the testing of the changed components and, for example, certification that the components are "production ready," the merged components are installed at the regional layer using base layer load modules. As shown in FIG. 6, for example, the "Base Load Modules" are used to install the "Base Merged" components from base layer 104 into the regional layer 106 libraries, for use by the SBUs.

It should be noted that the development and testing of the components in global layer 102 is merely illustrative, and the changed components may be staged directly into base layer 104 without first being integrated and merged within global layer 102.

Figure 18:
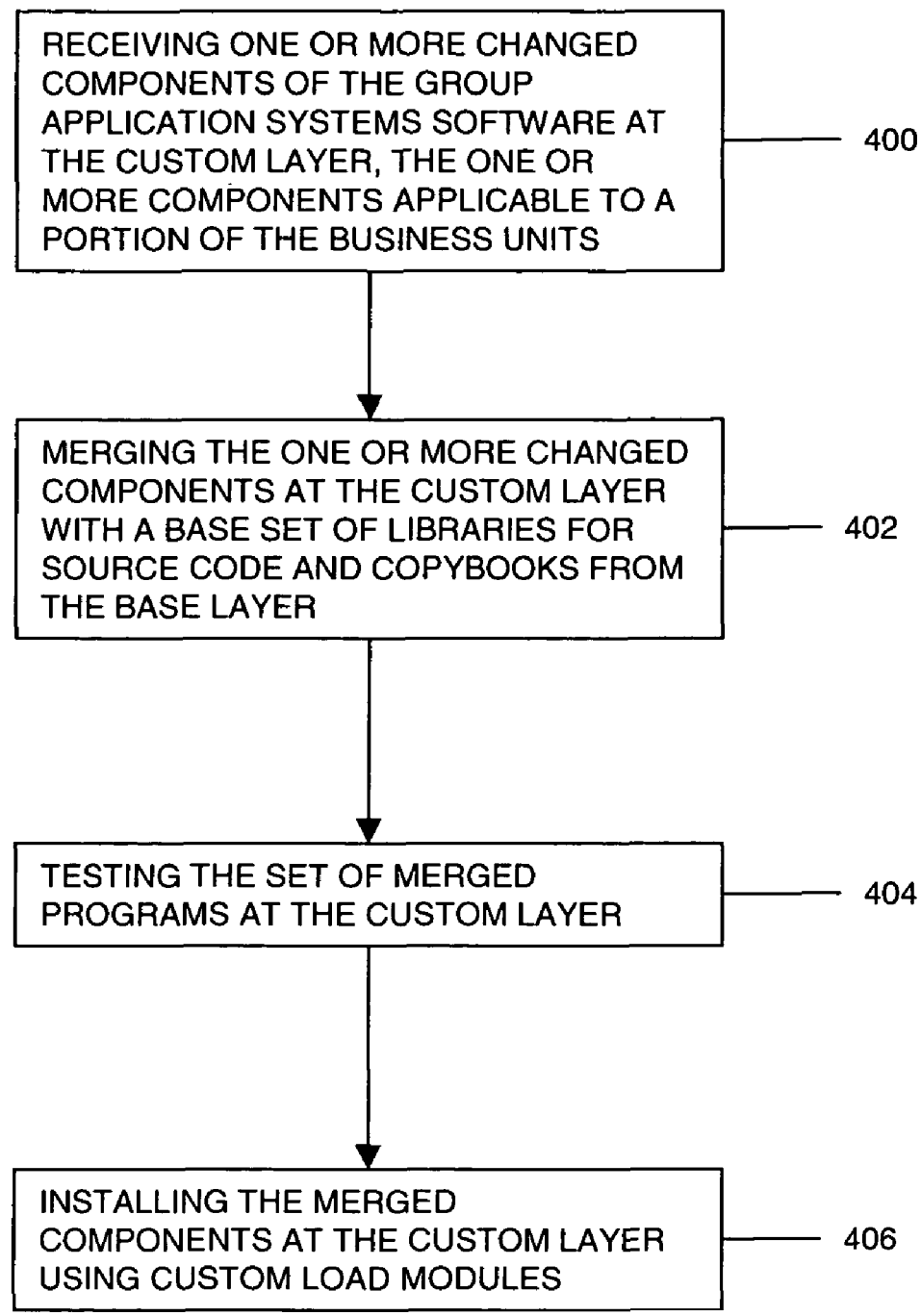
FIG. 18 is an illustrative flow diagram that demonstrates the configuration and release management of software locally to specific SBUs within the account management system in accordance with some embodiments of the present invention.

FIG. 18 is an illustrative flow diagram that demonstrates the configuration and release management of software locally to specific SBUs within the account management system. At step 400, one or more changed components of the group application systems software are received at the custom layer (e.g., custom layer 108 of FIG. 6). The one or more components may be applicable to only a subset of all SBUs (i.e., the components are "local," rather than "global"). At step 402, the one or more changed components are merged at the custom layer with a base set of libraries for source code and copybooks from the base layer. As shown in FIG. 6, for example, "Custom" changes are merged with "Base Merged" to form "Custom Merged" at custom layer 108. At step 404, the merged programs are tested at the custom layer. An example of testing at custom layer 108 is shown, for example, in FIG. 13, which illustrates the promotion of a component up to the installation step and the creation of testing environments to meet the requirements of the custom layer. At step 406, the merged components are installed at the custom layer using custom load modules (e.g., "Custom Load Modules" of custom layer 108 of FIG. 6).

On an annual basis changes made at each custom layer 108 are reviewed centrally to determine to what extent these changes have wider applicability. Any specific system changes or enhancements that may have been created for an SBU are candidates for inclusion in the globalized version of the group application system. Such enhancements are evaluated by a central committee that determines priority, funding and finalizes all aspects of the documentation for these changes. Changes then progress to the global layer 102 for integration and subsequent release to the base layer 104, as described hereinabove.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

What is claimed is:

1. A global framework computer based architecture, comprising:

a source code management system that provides executable development and testing environments to support component applications in production;

at least one set of associated tools and processes, in operative interaction with said source code management system, providing a single base of program code for said component applications to be managed and modified by said source code management system using said executable production environments for multiple business processing systems using the global framework computer based architecture;

a single set of libraries that contain all common source code management system elements applicable to said multiple business processing systems; individual code libraries for said multiple business processing systems that contain modifications specific to a business processing system to meet local needs of said business processing system and providing said multiple business processing systems the functionality of concatenation; and wherein the global framework computer based architecture provides functionality and is adapted to manage modifications of said multiple business processing systems, while simultaneously maintaining software source code release versions consistent and current across said multiple business processing systems.

2. The global framework computer based architecture of claim 1, further comprising individual online and/or batch execution environments to support data management and processing for each of said business processing systems.

3. The global framework computer based architecture of claim 1, further comprising at least one set of associated tools and processes, in operative interaction with said source code management system, to enable consistent use of and modification to source code management system elements common to said multiple business processing systems.

4. The global framework computer based architecture of claim 1, further comprising at least one regional load module library, in operative interaction with said source code management system, providing for installation of revised source code management system components for a specific business processing system or for multiple business processing systems within a particular time zone.

5. The global framework computer based architecture of claim 1, further comprising a plurality of naming standards to control and identify components, libraries, data sets, and/or execution environments within said source code management system.

6. The global framework computer based architecture of claim 1, wherein the global framework computer based architecture reduces the number of source code management system components for which changes need to be managed for said multiple business processing systems.

7. A global framework multi-layer computer based architecture including at least one source code management system that provides executable production environments to support component applications, comprising:

a base layer providing development and installation functionality for multiple business processing systems within the source code management system, wherein source code for said multiple business processing systems is staged to said base layer for integration with existing source code for said multiple business processing systems to create a merged base set of libraries, said merged base set of libraries containing all common source code management system elements applicable to said multiple business processing systems, and wherein said merged base set of libraries are tested in said base layer prior to implementation of said merged base set of libraries; and a custom layer, in operative interaction with said base layer, providing development and installation functionality for a business processing system of said plurality of business processing systems within the source code management system, wherein source code for said business processing system is staged to said custom layer for integration with existing source code for said business processing system to create a merged custom set of libraries, said merged custom set of libraries containing all modifications specific to said business processing system to meet local needs of said business processing system and providing said business processing system the functionality of concatenation, and wherein said merged custom set of libraries are tested in said custom layer prior to installation of said merged custom set of libraries.

8. The global framework multi-layer computer based architecture of claim 7, further comprising: a global layer, in operative interaction with said base layer, providing development functionality for said multiple business processing systems within the source code management system, wherein source code for said multiple business processing systems is developed within said global layer.

9. The global framework multi-layer computer based architecture of claim 8, wherein said source code developed within said global layer comprises source code from a plurality of separate entities, and wherein said source code from said plurality of separate entities is merged for testing in said global layer prior to staging to said base layer.

10. The global framework multi-layer computer based architecture of claim 7, further comprising: a regional layer, in operative interaction with said base and custom layers, providing installation functionality for said merged base set of libraries, wherein said installed base set of libraries support execution by said multiple business processing systems in batch and/or online by allowing said multiple business processing systems to implement said base set of libraries, if necessary, by concatenating said custom set of libraries and said base set of libraries installed in said regional layer.

11. The global framework multi-layer computer based architecture of claim 10, wherein said base set of libraries in said regional layer are protected such that contents of said base set of libraries cannot be changed at said regional layer.

12. The global framework multi-layer computer based architecture of claim 7, further comprising: an environment layer, in operative interaction with said custom layer, providing processing functionality for a business processing system of said plurality of business processing systems, wherein said installed base set of libraries support execution by said multiple business processing systems in batch and/or online by allowing said multiple business processing systems to implement said base set of libraries, if necessary, by concatenating said custom set of libraries and said base set of libraries.

13. The global framework multi-layer computer based architecture of claim 12, wherein said environment layer comprises a complete set of databases and data files for each business processing system of said multiple business processing systems.

14. The global framework multi-layer computer based architecture of claim 7, further comprising: a local layer, in operative interaction with said custom layer, providing application load modules for each business processing system of said multiple business processing systems, wherein said local layer load modules are dependent upon source code management system data.

15. The global framework multi-layer computer based architecture of claim 7, wherein said custom layer reduces time to market for modifications specific to each business processing system of said multiple business processing systems.

16. A global framework multi-layer computer based architecture including at least one source code management system that provides executable production environments to support component applications, comprising:

a global layer providing development functionality for multiple business processing systems within the source code management system, wherein source code for said multiple business processing systems is developed within said global layer;

a base layer, in operative interaction with said global layer, providing development and installation functionality for said multiple business processing systems, wherein said source code for said multiple business processing systems is staged to said base layer for integration with existing source code for said multiple business processing systems to create a merged base set of libraries, said merged base set of libraries containing all common source code management system elements applicable to said multiple business processing systems, and wherein said merged base set of libraries are tested in said base layer prior to installation of said merged base set of libraries;

a regional layer, in operative interaction with said base layer, providing installation functionality for said merged base set of libraries, wherein said installed base set of libraries support execution by said multiple business processing systems in batch and/or online;

a custom layer, in operative interaction with said regional layer, providing development and installation functionality for a business processing system of said plurality of business processing systems, wherein source code for said business processing system is staged to said custom layer for integration with existing source code for said business processing system to create a merged custom set of libraries, said merged custom set of libraries containing all modifications specific to said business processing system to meet local needs of said business processing system and providing said business processing system the functionality of concatenation, and wherein said merged custom set of libraries are tested in said custom layer prior to installation of said merged custom set of libraries;

an environment layer, in operative interaction with said custom layer, providing processing functionality for said business processing system of said plurality of business processing systems, wherein said installed base set of libraries support execution by said multiple business processing systems in batch and/or online by allowing said multiple business processing systems to implement said base set of libraries, if necessary, by concatenating said custom set of libraries and said base set of libraries; and a local layer, in operative interaction with said environment layer, providing application load modules for each business processing system of said multiple business processing systems, wherein said local layer load modules are dependent upon source code management system data.

17. The global framework multi-layer computer based architecture of claim 16, wherein said regional layer includes source code components and load module components as a copy of said base layer installed load module components.

18. A source code management system comprising:
a first multi-layer framework for managing and maintaining an existing production environment for multiple business processing systems, comprising:
  a base layer providing a base set of libraries including source code management system elements common to said multiple business processing systems; and
  a custom layer, in operative interaction with said base layer, providing a custom set of libraries including source code specific to a portion of said business processing systems;
a second multi-layer framework, in operative interactive with said first multi-layer framework, providing functionality for development and testing of a source code enhancement release within the source code management system, comprising:
  a base layer for accepting said enhancement release; and
  a custom layer for integrating release modifications and testing said enhancement release,
  wherein said custom layer receives contents of said custom layer of said first multi-layer framework; and wherein said enhancement release is tested within said second multi-layer framework prior to implementation within said first multi-layer framework.

19. The source code management system of claim 18, wherein said second multi-layer framework reverts to a testing environment upon certification and installation of said enhancement release.

20. The source code management system of claim 18, wherein said first and second multi-layer frameworks provide the ability to rollback changes to a previous version of the source code management system if there are any problems with said enhancement release.

21. The source code management system of claim 18, wherein said second multi-layer framework further comprises a complete set of change management software mnemonics, source libraries, copybook libraries, and/or load module libraries to support said base and custom layers of said second multi-layer framework.

22. A method for configuration and release management of group application systems software within a source code management system, comprising:
  receiving one or more changed components of group application systems software at a global layer of the source code management system;
  integrating said one or more changed components of the group application systems software into a single set of merged programs at said global layer;
  testing said single set of merged programs at said global layer;
  merging said one or more changed components into a base set of libraries for source code and copybooks at a base layer of the source code management system;
  testing said one or more changed components at said base layer; and
  installing said merged components at a regional layer using base load modules.

23. The method for configuration and release management of group application systems software of claim 22, further comprising: providing said multiple business processing systems with the ability to implement said base set of libraries in batch and/or online by allowing said multiple business processing systems to concatenate a custom set of libraries at a custom layer and said base set of libraries.

24. A method for configuration and release management of group application systems software within a source code management system, comprising: receiving one or more changed components of group application systems software at a custom layer of the source code management system, wherein said one or more components are applicable to only a portion of multiple business processing systems within the source code management system; merging said one or more changed components at said custom layer with a base set of libraries for source code and copybooks to create a custom set of libraries; testing said custom set of libraries at said custom layer; and installing said custom set of libraries at said custom layer using custom load modules.

25. The method for configuration and release management of group application systems software of claim 24, further comprising: providing said multiple business processing systems with the ability to implement said custom set of libraries in batch and/or online by allowing said multiple business processing systems to concatenate said custom set of libraries and a base set of libraries.

26. A multilayer computer based architecture including at least one source code management system that provides development and testing tools and processes for developing an executable package, comprising:
  a plurality of layers in operative interaction with each other, the plurality of layers including a base layer having a set of load libraries providing a development, installation, and testing environment for the executable package, the executable package being promoted between the plurality of layers and the set of load libraries of the base layer being merged with a load module of the executable package upon installation of the executable package at the base layer;
  an environment layer for one of a plurality of business processing systems in operative interaction with the plurality of layers, the environment layer providing an installation and executable environment for the executable package; and
  a change management structure controlling the promotion of the executable package between the plurality of layers.

27. The multilayer computer based architecture as recited in claim 26, wherein the set of load libraries of the base layer is modified when merged with the load module of the executable package so as to create a merged custom set of libraries.

28. The multilayer computer based architecture as recited in claim 26, wherein at least one of the plurality of layers includes a layer having a set of common libraries applicable to each of the plurality of business processing systems.

29. The multilayer computer based architecture as recited in claim 26, wherein the additional layer is remote from the multilayer computer based architecture.

30. A global framework multi-layer computer based architecture including at least one source code management system that provides executable production environments to support component applications, comprising:
  a base layer providing development and installation functionality for multiple business processing systems within the source code management system including base source code for said multiple business processing systems that provides common functionality for the multiple business processing systems and to be merged and compiled with custom source code for at least one of said multiple business processing systems to create merged source code and merged executable software code, said base source code including common source code management system elements comprising the common functionality that is common to and required by said multiple business processing systems, and wherein the merged source code is tested in said base layer prior to distribution of the merged executable software code; and a custom layer, in operative interaction with said base layer, providing development and installation functionality for a business processing system of said plurality of business processing systems within the source code management system, wherein custom source code for said business processing system is staged to said custom layer for integration with the base source code for said business processing system to create merged source code, said merged source code including modifications to the base source code specific to said business processing system to meet local needs of said business processing system, and wherein said merged custom set of libraries are tested in said custom layer prior to installation of said merged executable software code.

* * * * *